(12) United States Patent
Lin et al.

(10) Patent No.: US 9,575,597 B2
(45) Date of Patent: Feb. 21, 2017

(54) OPTICAL TOUCH SYSTEM AND OBJECT ANALYZATION METHOD THEREOF

(71) Applicant: PIXART IMAGING INC., Hsin-Chu (TW)

(72) Inventors: Yu-Chia Lin, Hsin-Chu (TW); Chih-Hsin Lin, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 14/567,178

(22) Filed: Dec. 11, 2014

(65) Prior Publication Data

US 2015/0212652 A1     Jul. 30, 2015

(30) Foreign Application Priority Data

Jan. 24, 2014   (TW) .............................. 103102669 A

(51) Int. Cl.
| | | |
|---|---|---|
| G06F 3/042 | (2006.01) | |
| G06K 9/00 | (2006.01) | |
| G06K 9/20 | (2006.01) | |
| G06K 9/46 | (2006.01) | |

(52) U.S. Cl.
CPC ......... *G06F 3/0421* (2013.01); *G06K 9/00355* (2013.01); *G06K 9/2027* (2013.01); *G06K 9/4661* (2013.01)

(58) Field of Classification Search
CPC .................. G06F 3/0421; G06F 3/0428; G06F 2203/04109;G06K 9/00355; G06K 9/46661

See application file for complete search history.

(56) References Cited

U.S. PATENT DOCUMENTS

| | | | |
|---|---|---|---|
| 2004/0178993 A1 | 9/2004 | Morrison et al. | |
| 2011/0050644 A1* | 3/2011 | Su ......................... | G06F 3/0428 345/175 |

FOREIGN PATENT DOCUMENTS

| | | |
|---|---|---|
| TW | 201108058 A1 | 3/2011 |
| TW | 201339920 A | 10/2013 |

\* cited by examiner

*Primary Examiner* — Premal Patel
(74) *Attorney, Agent, or Firm* — Li & Cai Intellectual Property (USA) Office

(57) ABSTRACT

The present disclosure provides an optical touch system and an object analyzation method thereof. The optical touch system includes a panel and an image sensing apparatus installed thereon. The object analyzation method includes the following steps: capturing a first image across a touch surface of the panel with an image sensing apparatus, wherein the first image has an object image formed corresponding to the position of a pointer on the touch surface; defining an image window that corresponds to the image position of the object image in the first image captured; determining whether the pointer is touching the touch surface or hovering over the touch surface by analyzing the brightness difference among the plurality of pixels in the image window.

27 Claims, 18 Drawing Sheets

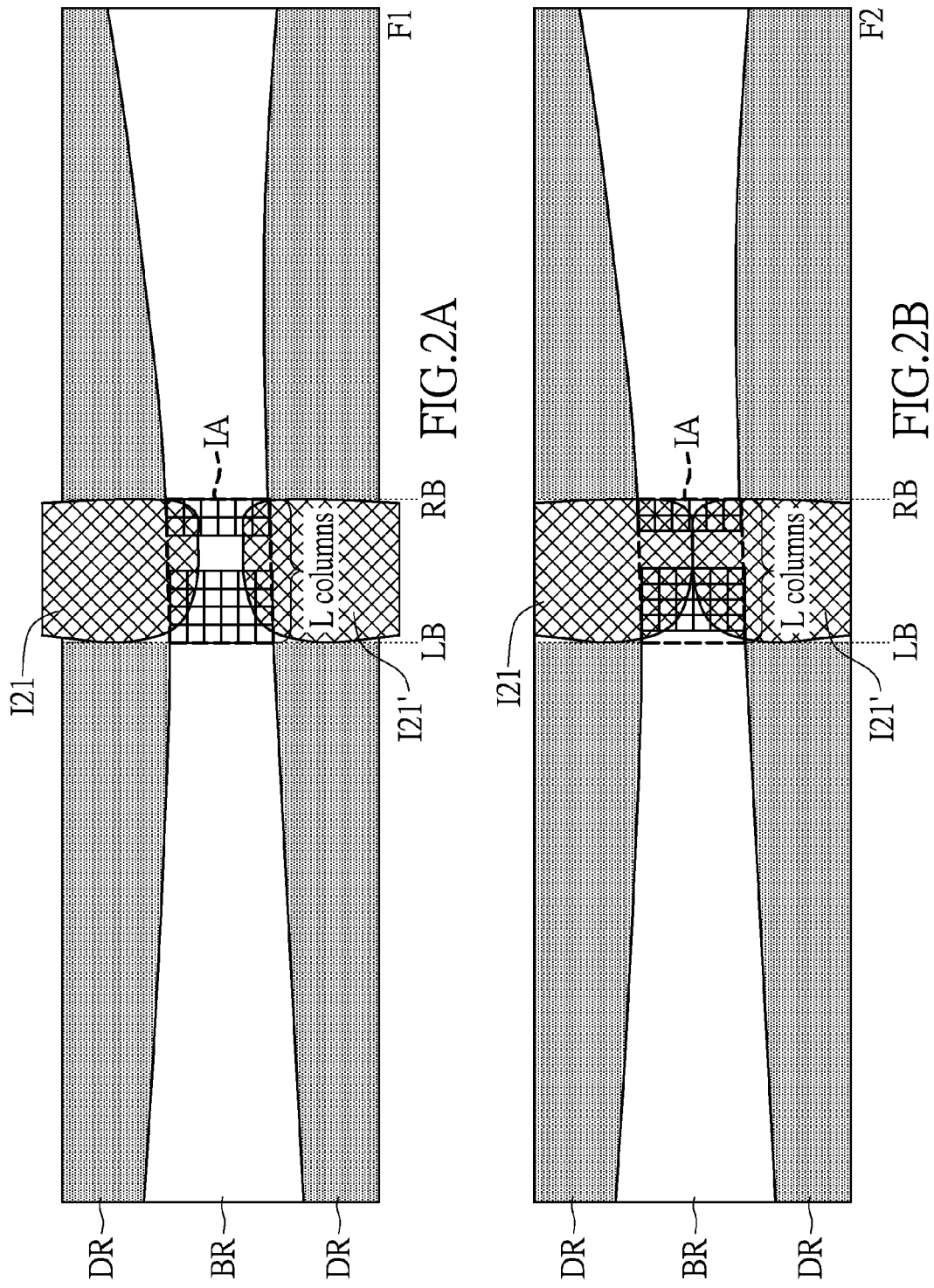

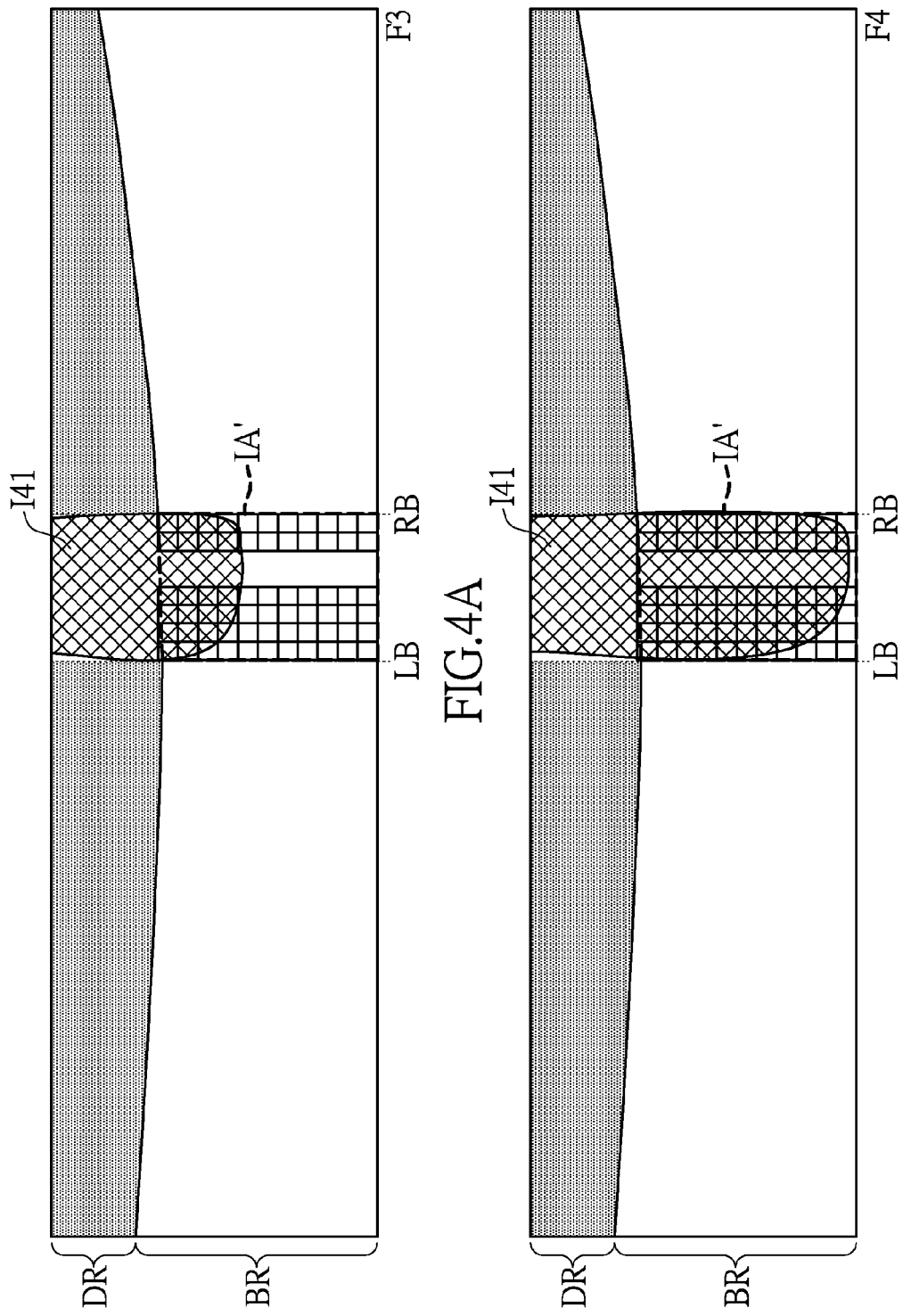

OPTICAL TOUCH SYSTEM AND OBJECT ANALYZATION METHOD THEREOF

BACKGROUND

1. Technical Field

The present disclosure relates to a touch system in particular, to an optical touch system and an object analyzation method thereof.

2. Description of Related Art

As touch technology advances, touch panels have gradually integrated with display apparatuses to form touch-screen displays which enable users to operate touch-screen displays by direct touch. Optical touch systems have the advantage of high precision, high reliability, multi-touch support, low failure rate, fast response, and no manufacturing limitations, and have been widely used in a variety of mid-size and large scale electronic products.

A typical optical touch system includes at least an image sensor and a plurality of light-emitting diodes (LEDs), e.g., infrared LEDs (IR LEDs). During the operation of the optical touch system, the light-emitting diodes operatively emit a light to illuminate a touch surface of the optical touch system. Whenever an object, such as a finger or a stylus, touches the touch surface, the object blocks the light emitted from the LEDs and forms a shadow pattern on the touch surface. The optical touch system can through utilizing an image sensor to capture images across the touch surface and computing touch positions of the object relative to the touch surface thereafter based on whether the images captured have a shadow pattern formed therein and the image position associated with the shadow pattern, achieving touch control operation.

SUMMARY

Exemplary embodiments of the present disclosure provide an optical touch system and an object analyzation method thereof, in which the object analyzation method can enable the optical touch system to quickly and accurately determine whether an approaching object is touching the touch surface of the optical touch system or hovering over the touch surface, thereby effectively improving the recognition rate of the touch point.

An exemplary embodiment of the present disclosure provides an object analyzation method of an optical touch system and the object analyzation method includes the following steps. A first image across a touch surface of a panel is first captured with an image sensing apparatus, wherein the first image contains an object image formed corresponding to the position of a pointer on the touch surface. An image window corresponding to the object image is defined in the first image thereafter. Whether the pointer is touching the touch surface or hovering over the touch surface is then determined according to the brightness difference among a plurality of pixels in the image window. When determines that the pointer is touching the touch surface, computing a touch coordinate of the pointer relative to the touch surface according to the image position of the object image formed in the first image.

Another exemplary embodiment of the present disclosure provides an object analyzation method of an optical touch system comprising of a panel, a first image sensing apparatus and a second image sensing apparatus, wherein the first and second image sensing apparatuses are respectively disposed at different locations on the touch panel and are configured to have overlapping sensing area. The object analyzation method includes the following steps. A first background image and a second background image corresponding to a touch surface of the panel are captured with the first image sensing apparatus and the second image sensing apparatus, respectively. The first background image and the second background image are respectively captured before a pointer approaches the touch surface. Then, a first image and a second image across the touch surface of the panel are respectively captured with the first image sensing apparatus and the second image sensing apparatus. The first image has a first object image formed therein corresponding to the position of the pointer on the touch surface with respect to the first image sensing apparatus and the second image has a second object image formed therein corresponding to the position of the pointer on the touch surface with respect to the second image sensing apparatus. Next, a first image window corresponding to the first object image is defined in the first image. A second image window corresponding to the second object image is further defined in the second image. Then, whether the pointer is touching the touch surface or hovering over the touch surface is determined thereafter according to the brightness difference among a plurality of pixels in the first and second image windows, respectively.

An exemplary embodiment of the present disclosure provides an optical touch system. The optical touch system includes a panel having a touch surface, at least a light-emitting component, a reflective mirror, at least a reflecting unit, an image sensing apparatus, and a processing unit. The light-emitting component is configured to generate a light illuminating the touch surface. The reflective mirror is configured to generate the mirror image of the panel. The reflecting unit is configured to reflect the light generated by the light-emitting component. The image sensing apparatus is configured to capture a plurality of images across the touch surface of the panel. At least one of the images captured has an object image corresponding to a pointer and the mirror image of the object image formed therein. The processing unit is coupled to the light-emitting component, the image sensing apparatus, and a display apparatus. The processing unit operatively drives the image sensing apparatus to capture a first image across the touch surface of the panel, wherein the first image has an object image formed therein corresponding to the position of a pointer on the touch surface. Thereafter, the processing unit defines an image window corresponding to the object image in the first image. Afterward, the processing unit determines whether the pointer is touching the touch surface or hovering over the touch surface according to the brightness difference among a plurality of pixels in the image window. Then, the processing unit decides whether or not to compute a touch coordinate of the pointer relative to the touch surface based on the determination result.

An exemplary embodiment of the present disclosure provides a non-transitory computer-readable media, for storing a computer executable program corresponding to the aforementioned object analyzation method of an optical touch system. When the non-transitory computer readable recording medium is read by a processor, the processor operatively executes the aforementioned object analyzation method.

To sum up, exemplary embodiments of the present disclosure provide an optical touch system and an object analyzation method thereof, in which the object analyzation method can enable the optical touch system to quickly and accurately determines whether an approaching object is touching the touch surface of the optical touch system or hovering over the touch surface by analyzing the brightness distribution of a shadowed region in an image captured across the touch surface, the optical touch system can thus accurately determine and identify the touch state of a pointer. The object analyzation method further is capable of deciding whether to compute the touch coordinate of the object detected, effectively improves the recognition rate of touch points in the optical touch system as well as the operation efficiency of the optical touch system.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 2A is a schematic diagram illustrating an image containing an object image captured by an image sensing apparatus provided in accordance with an exemplary embodiment of the present disclosure.

FIG. 2B is a schematic diagram illustrating another image containing an object image captured by an image sensing apparatus provided in accordance with an exemplary embodiment of the present disclosure.

FIG. 4A~FIG. 4B are schematic diagrams respectively illustrating 2D images captured by an image sensing apparatus provided in accordance with an exemplary embodiment of the present disclosure.

FIG. 15-1 FIG. 15-2 are flowchart diagrams respectively illustrating an object analyzation method of an optical touch system provided in accordance to an exemplary embodiment of the present disclosure.

DESCRIPTION OF THE EXEMPLARY EMBODIMENTS

Figure 1:
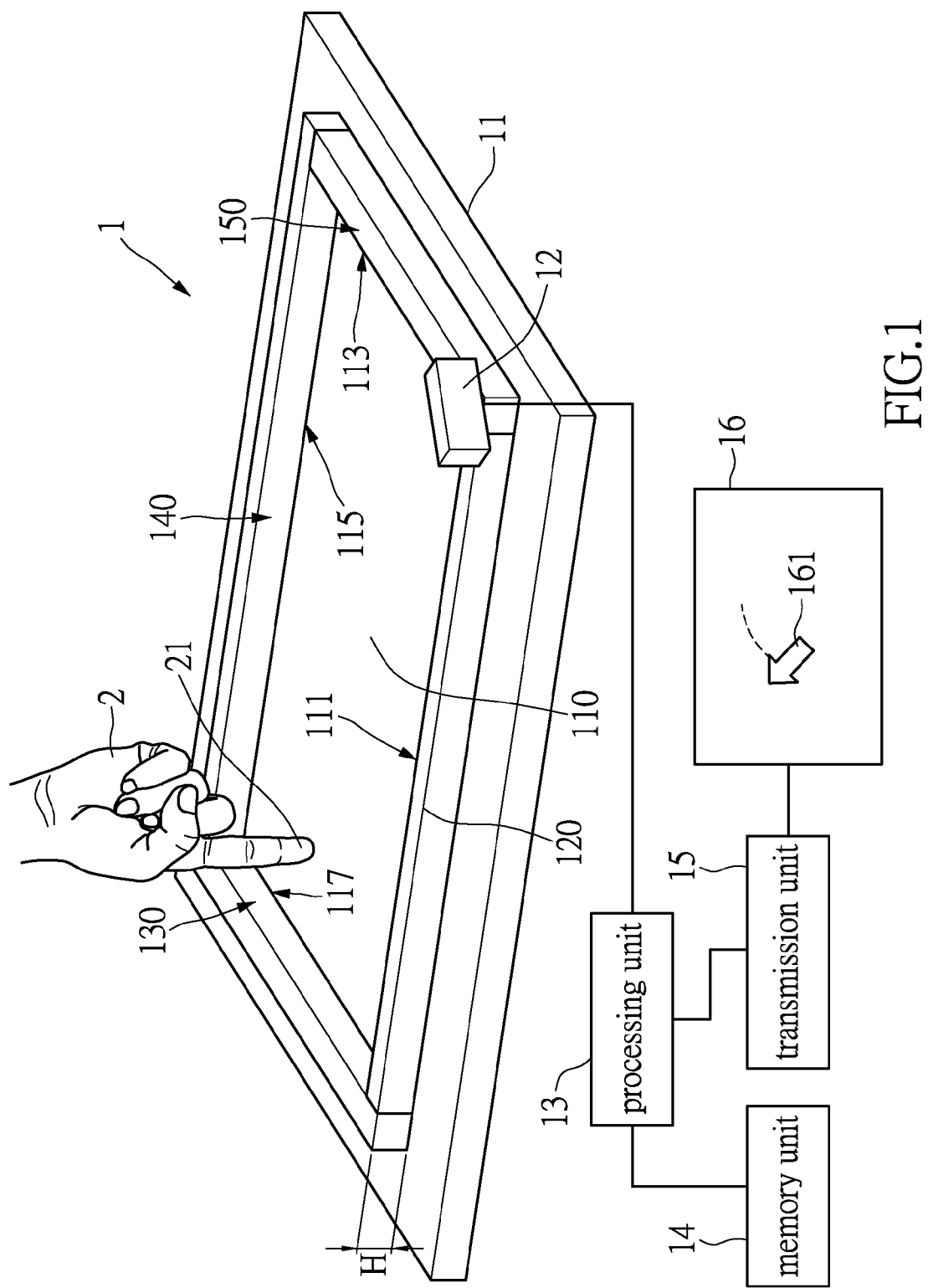
FIG. 1 is a diagram of an optical touch system provided in accordance with an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

An optical touch system of the present disclosure is operable to automatically define an image window in an image, which has an object image formed therein corresponding to a pointer, captured by an image sensing apparatus, and accurately determine whether the pointer approaching a touching region of the optical touch system is touching a touch surface of the optical touch system or is hovering over the touch surface according to the pixel brightness distribution of the image window. Accordingly, the recognition rate of touch point and the touch sensitivity can be effectively enhanced.

(An Exemplary Embodiment of an Optical Touch System)

Please refer to FIG. 1, which shows a diagram illustrating an optical touch system provided in accordance with an exemplary embodiment of the present disclosure. An optical touch system 1 is configured to operatively sense a touch position of at least one pointer. In the instant embodiment, the pointer is a finger 21 of a user 2. In other embodiments, the pointer may be a stylus, a touch stick, or any other touch object. However, the present disclosure is not limited thereto.

The optical touch system 1 includes a panel 11, an image sensing apparatus 12, a light-emitting component 120, a reflective mirror 130, a first reflecting unit 140, a second reflecting unit 150, a processing unit 13, a memory unit 14, a transmission unit 15, and a display apparatus 16. The light-emitting component 120, the image sensing apparatus 12, the memory unit 14, the transmission unit 15, and the display apparatus 16 are coupled to the processing unit 13, respectively.

Briefly, during the operation of the optical touch system 1, the processing unit 13 operatively controls the operations of the light-emitting component 120, the image sensing apparatus 12, the memory unit 14, and the transmission unit 15. The processing unit 13 further controls the operation of a cursor 161 displayed on the display apparatus 16 based on the sensing result of the image sensing apparatus 12.

The image sensing apparatus 12, the light-emitting component 120, the reflective mirror 130, the first reflecting unit 140, and the second reflecting unit 150 are respectively disposed on the panel 11. The panel 11 can be a whiteboard, a transparent board (e.g., glass board or plastic board), or a touch screen.

In the instant embodiment, the panel 11 is a reflective mirror or has a reflecting surface. The panel 11 is substantially a rectangular-shaped board. The panel 11 has a touch surface 110, and the touch surface 110 is also rectangular-shaped. Specifically, the touch surface 110 has four straight edges, i.e., a first edge 111, a second edge 113, a third edge 115 opposite to the first edge 111, and a fourth edge 117 opposite to the second edge 113. The first edge 111 intersects with the second edge 113 forming a first corner; the first edge 111 intersects with the fourth edge 117 forming a second corner; the second edge 113 intersects with the third edge 115 forming a third corner; the third edge 115 intersects with the fourth edge 117 forming a fourth corner.

The region surrounded by the touch surface 110, the light-emitting component. 120, the reflective mirror 130, the first reflecting unit 140, and the second reflecting unit 150 forms a touch sensing region TR of the optical touch system. The touch sensing region TR has a height H, wherein the height H may be configured based on the exact structure of the optical touch system 1 and the operation requirement thereof.

The light-emitting component 120 is disposed at the first edge 111 of the touch surface 110. The light-emitting component 120 is configured to provide necessary lighting supporting the operation of the optical touch system 1. The light-emitting component 120 can be configured to emit invisible light such as, infrared light or ultraviolet light, to illuminate the entire touch surface 110.

In one embodiment, the light-emitting component 120 may include a plurality of light-emitting elements which may be arranged along the first edge 111 of the touch surface 110. In another embodiment, the light-emitting component 120 may include a light-emitting element and a light guide (e.g., light guide plate). The light-emitting element scatters light to the light guide, and the light guide evenly distributes the light onto the touch surface 110. The light-emitting element described herein can be an infrared light emitting diode (IR LED) or an ultraviolet light emitting diode (UV LED). It is worth to mention that the light emitted by the light-emitting component 120 may also be visible light. It shall be noted that the exact implementation of the light-emitting component 120 may be determined based on the practical operation of the optical touch system 1 and the instant embodiment is not limited thereto.

The reflective mirror 130 is disposed at the fourth edge 117 of the touch surface 110, and the reflective mirror 130 is protruded above the touch surface 110. More specifically, in the instant embodiment, the reflective mirror 130 extends a height H in an upper direction from the touch surface 110. The reflective mirror 130 has a reflecting surface facing the touch surface 110 to reflect the invisible light emitted from the light-emitting component 120 onto the touch surface 110.

The reflective mirror 130 also generates a mirror image of the touch sensing region TR, as well as generates a mirror image of the pointer (not shown) being controlled to perform operations on the touch surface 110. The reflective mirror 130 can be implemented by a planar mirror. The reflecting surface of the reflective mirror 130 is configured to face the touch sensing region TR.

The first reflecting unit 140 is disposed at the third edge 115 of the touch surface 110. The second reflecting unit 150 is disposed at the second edge 113 of the touch surface 110. The first reflecting unit 140 and the second reflecting unit 150 respectively protrude above the touch surface 110. The first reflecting unit 140 and the second reflecting unit 150 may be for example made of reflective cloth. The first reflecting unit 140 and the second reflecting unit 150 are configured to face the touch sensing region TR, respectively to reflect the light emitted from the light-emitting component 120. The first reflecting unit 140 and the second reflecting unit 150 respectively extend a height H in the upper direction from the touch surface 110.

In the instant embodiment, the heights of the reflective mirror 130, the first and the second reflecting units 140, 150 are all configured to be height H. However it shall be understood by those skilled in the art, that the heights of the reflective mirror 130, the first and the second reflecting units 140, 150 can be configured according to the practical operation requirement of the optical touch system 1.

The first and the second reflecting units 140, 150 can adopt retro-reflective material to attain light reflecting effect, however the instant embodiment is not limited thereto so long as the first and the second reflecting units 140, 150 can reflect the light emitted by the light-emitting component 120 onto the touch surface 110 and preferably not generate the mirror image of the touch sensing area TR. In other embodiments, the first and the second reflecting units 140, 150 can each be replaced by three light-emitting components, so long as the three light-emitting components are all configured to face and illuminate the touch surface 110.

The image sensing apparatus 12 is deployed at the first corner of the touch surface 110. In another embodiment, the image sensing apparatus 12 may be deployed at the second corner or at the first edge 111 of the touch surface 110 so long as the image sensing apparatus 12 is deployed at the position that is opposite to the position of the reflective mirror 130.

The image sensing apparatus 12 is configured to operatively sense the touching operation of the pointer (i.e., the finger 21 of the user 2) in the touch sensing region TR. Specifically, the image sensing apparatus 12 is configured to capture a plurality of images across the touch surface 110 including the touch sensing region TR that is surrounded by the touch surface 110, the reflective mirror 130, the first reflecting unit 140, and the second reflecting unit 150. The images captured at least include a background image and an image having an object image formed therein corresponding to the position of the pointer on the touch surface 110. The background image is the image captured across the touch surface 110 encompassing the touch sensing region by the image sensing apparatus 12 during the time period that the pointer has not yet approaching the touch surface 110.

The image sensing apparatus 12 may further include a filter (e.g., IR-pass filter) for allowing only lights with specified wavelengths (e.g., IR light) to be sensed and received.

The field of view of the image sensing apparatus 12 can be configured to lean toward the touch surface 110 and the leaning angle thereof can be configured according to the exact installation requirement and the range of image sensing area required, so long as the image sensing apparatus 12 can view across the touch sensing region TR of the touch surface 110. The longitudinal field of view of the image sensing apparatus 12 is preferably configured to be greater than the height of the touch sensing region TR.

The image sensing apparatus 12 can be implemented by a charge-coupled device (CCD) image sensor or a complementary metal oxide semiconductor (CMOS) image sensor. Those skilled in the art should be able to design and implement the image sensing apparatus 12 according to practical operation requirements and the instant embodiment is not limited thereto.

The processing unit 13 is configured to operatively determine whether the pointer (i.e., the finger 21) is touching (or in contact with) the touch surface 110 or is hovering over the touch surface 110 according to images captured across the touch surface 110 by the image sensing apparatus 12. The processing unit 13 operatively decides whether to compute a touch coordinate of the pointer (i.e., the finger 21) relative to the touch surface 110 based on the determination result. The processing unit 13 further drives the transmission unit 15 to transmit touch coordinate information to the display apparatus 16 to correspondingly control the movement of the cursor 161 displayed on the display apparatus 16.

The processing unit 13 in the instant embodiment can drive the image sensing apparatus 12 to capture images across the touch surface 110 according to a predetermined frame rate. The processing unit 13 operatively determines whether or not a pointer (i.e., the finger 21) is approaching the touch sensing region TR as well as whether the pointer (i.e., the finger 21) is touching or hovering over the touch surface 110 according to the images captured. The predetermined frame rate may be configured according to the actual application and the operating environment (e.g., the surrounding brightness or the ambient light setting) associated with the optical touch system 1, and the instant embodiment is not limited thereto. In another embodiment, the processing unit 13 may drive the image sensing apparatus 12 to continuously capture images across the touch surface 110 in a manner such that the processing unit 13 can continuously detect the touching state of the pointer in the touch sensing region TR according to the images captured or detect the touching state of the pointer in the touch sensing region TR after a preset period of time (e.g., perform detection every three image captured or every 2 seconds).

The memory unit 14 is configured to store images captured by the image sensing apparatus 12 and the related parameters for determining whether the pointer is touch the touch surface 110 or is hovering over the touch surface 110. The memory unit 14 further can store the touch coordinate of the pointer computed relative to the touch surface 110.

Briefly, when the processing unit 13 detects a pointer approaching the touch surface 110 according to one of the image captured by the image sensing apparatus 12, the processing unit 13 operatively defines an image window that corresponds to an object image formed corresponding to the pointer in the image captured. The processing unit 13 determines whether the pointer (e.g., the finger 21) is touching (or in contact with) the touch surface 110 or is hovering over the touch surface 110 according to the brightness difference among a plurality of pixels in the image window.

When the processing unit 13 determines that the pointer is touching the touch surface 110, the processing unit 13 computes the touch coordinate of the pointer relative to the touch surface 110 according to the image position of the pointer and the image position of the mirror image associated with the pointer (i.e., the image mirrored by the reflective mirror 130) formed in the image. It shall be noted that those skilled in the art should understand that the phrase of "in contact with the touch surface 110" and the phrase of "touching the touch surface 110" have the same meaning throughout the entire context of the present disclosure and are therefore used interchangeably.

More specifically, please refer to FIG. 2A~2B in conjunction with FIG. 1, in which FIG. 2A and FIG. 2B show schematic diagrams respectively illustrating 2D images containing the object images captured by an image sensing apparatus provided in accordance to an exemplary embodiment of the present disclosure. FIG. 2A shows a 2D image illustrating the pointer (e.g., the finger 21) hovering over the touch surface 110 while FIG. 2B shows a 2D image depicting the pointer (e.g., the finger 21) that is touching the touch surface 110.

As described previously, the longitudinal field of view (or the longitudinal sensing area) of the image sensing apparatus 12 is configured to be greater than the height of the touch sensing region TR, therefore the image F1 captured by the image sensing apparatus 12 includes a background region DR and a bright region BR.

The height of the bright region BR is determined by the touch surface 110, the reflective mirror 130, the first reflecting unit 140, and the second reflecting unit 150. More specifically, as the light-emitting component 120, the reflective mirror 130, the first reflecting unit 140, and the second reflecting unit 150 emit or reflect light, hence the bright region BR of relatively high brightness will be formed in the image captured by the image sensing apparatus 12. The background region DR encompasses the region outside the touch surface 110, the reflective mirror 130, the first reflecting unit 140, and the second reflecting unit 150. Since the background region DR does not have any light reflecting component to reflect the light emitted from the light-emitting component 120, thus the background region DR is relatively dark. The method of defining the bright region BR will be described in other embodiments of the instant disclosure, thus further descriptions are hereby omitted.

When the finger 21 of the user 2 approaches or comes near the touch surface 110 but not in contact with the touch surface 110, the image F1 captured by the image sensing apparatus 12 will contain the object image I21, I21' that correspond to the position of finger 21 on the touch surface 110 and the mirror images of the finger 21 mirrored by the reflective mirror 130 (not shown in FIG. 2A and FIG. 2B).

More specifically, the dark object image I21 (also referred to as the optical information of the object, the shadowing point, or the darker spot) and the mirror image that corresponds to the finger 21 mirrored by the reflective mirror 130 (also referred to as the optical information of the mirror image, the shadowing point, or the darker spot) will form in the image F1 as the finger 21 of the user 2 blocks a portion of lights emitted by the light-emitting component 120 or reflected by the reflective mirror 130. Moreover, since the touch surface 110 of the instant embodiment is a reflective mirror, hence the image F1 captured by the image sensing apparatus 12 further includes the mirror image reflected from the touch surface 110 i.e., the object image I21'. The image F1 has M×N pixels, wherein M and N are integers.

As shown in FIG. 2A, when the finger 21 of the user 2 approaches but not in contact with the touch surface 110, the object image I21 corresponding to the finger 21 and the object image I21' corresponding to the mirror image of the finger 21 formed in the image F1 does not connect to each other and is spaced a distance, wherein the distance is the height between the tip of the finger 21 and the touch surface 110. As shown in FIG. 2B, when the finger 21 of the user 2 touches or contacts the touch surface 110, the object image I21 and the object image I21' formed in the image F2 connects to each other. The image F2 also has M×N pixels. The number of pixels in the images F1 and F2 are determined by the resolution of the image sensing apparatus 12.

Next, the processing unit 13 defines a left boundary LB and a right boundary RB in the image F1 or the image F2 according to the image positions of object images I21 and I21' in the image F1 or the image F2 and a background image associated with the optical touch system 1, so as to define an image window IA that corresponds to the image positions of object images I21 and I21' in the image F1 or the image F2. In other words, the image window IA is defined by the bright region BR, the left boundary LB, and the right boundary RB. The background image is the image captured by the image sensing apparatus 12 before the finger 21 approaches the touch sensing region TR. More specifically, the background image does not contain the object image that corresponds to the pointer. The brightness associated with the positions of the object images I21 and I21' in the bright region BR of the image F1 is relatively lower in comparison to the brightness of the bright region in the background image, hence the image window IA can be defined accordingly.

As shown in FIG. 2A, when the finger 21 does not contact or touch the touch surface 110, the brightness distribution among a plurality of pixels in the image window IA will be uneven as the object image I21 and the object image I21 in the image F1 does not connect to each other. That is, the difference or variation among all the pixels in each pixel column inside the image window IA will be relatively large. Conversely, when the pointer contacts the touch surface 110, the object image I21 and the object image I21' (the mirror image of the finger 21) connect to each other as shown in FIG. 2B, thus the brightness distribution among the plurality of pixels in the image window IA will be even. That is, the difference or variation among all the pixels in each pixel column inside the image window IA will be relatively small.

Accordingly, the processing unit 13 can determine whether the finger 21 is touching the touch surface 110 or is hovering over the touch surface 110 according to the brightness difference among the pixels of the plurality of pixel columns (i.e., the L pixel columns) inside the image window IA in the image F1 or the image F2, wherein L is integer and L is less than N.

Particularly, the processing unit 13 can determine whether the finger 21 is touching the touch surface 110 or is hovering over the touch surface 110 based on the change of the pixel value (e.g., the gray level) among the pixels in each pixel column (i.e., L pixel columns) inside the image window IA in the image F1 or the image F2, such as the variance of each pixel column, the pixel value ratio or the pixel value difference between the maximum brightness value and the minimum brightness value of each pixel column, or the average pixel value of each pixel column, without having to compute or analyze the image information of the object image I21' corresponding to the finger 21 reflected form the touch surface 110.

Since the difference in brightness between the background region DR and the bright region BR is obvious, therefore when the finger 21 blocks lights that contribute to the bright region BR, the variance of the pixel columns that corresponds to the lights blocked by the finger 21 will become smaller. Hence, in one embodiment, the processing unit 13 can compute the variance among the pixels for each respective pixel column in the image window IA. The smaller the variance of pixels of each pixel column in the image window IA is, the larger the covered area; the larger the variance of pixels of each pixel column in the image window IA is, the smaller the covered area. Therefore, when the variance of the pixel column having the largest pixel variance is computed to be greater than a preset pixel variance, the processing unit 13 can determine that the finger 21 is hovering over the touch surface 110.

In another embodiment, the processing unit 13 may compute the pixel ratio between the maximum pixel value and the minimum pixel value for each pixel column in the image window IA. In the instant embodiment, the processing unit 13 can determine that the finger 21 is hovering over the touch surface 110 when the pixel ratio of the pixel column having the largest pixel ratio is computed to be greater than a preset pixel ratio value (e.g., 1).

In further another embodiment, the processing unit 13 may also compute the pixel value difference between the maximum pixel value and the minimum pixel value for each pixel column in the image window IA. In the instant embodiment, the processing unit 13 can determine that the finger 21 is hovering over the touch surface 110 when the pixel value difference of the pixel column having the smallest pixel value difference is computed to be greater than a preset pixel value difference (e.g., 0).

In further another embodiment, the processing unit 13 may also compute the average pixel value for each pixel column in the image window IA. In the instant embodiment, the processing unit 13 can determine that the finger 21 is touching the touch surface 110 when the average pixel value of the pixel column having the smallest pixel value difference is computed to be less than a preset average pixel value.

In further another embodiment, the processing unit 13 may define a first pixel group and a second pixel group in the image window IA, wherein the first and the second pixel groups are defined for the processing unit 13 to analyze the difference in brightness of the image window IA, so as to determine whether the pointer is touching or hovering over the touch surface 110.

To put it concretely, the first pixel group is a high brightness pixel group and the first pixel group includes at least a high brightness pixel, wherein the high brightness pixel is the pixel in the image window IA having the pixel value larger than a preset threshold. The second pixel group is a low brightness pixel group and the second pixel group includes at least a low brightness pixel, wherein the low brightness pixel is the pixel in the image window IA having the pixel value smaller than the preset threshold. The preset threshold may be configured according to the average brightness of the bright region BR in an image captured, e.g., 75%~90% of the average brightness of the bright region BR, and the instant embodiment is not limited thereto.

When the processing unit 13 determines that the finger 21 is hovering over the touch surface 110, the processing unit 13 does not compute the touch coordinate of the pointer relative to the touch surface 110 of the panel 11. For instance, the processing unit 13 may fix or lock the display position of the cursor 161 on the display apparatus 16 by not outputting any touch coordinate information or outputting the touch coordinate information associated with the pointer relative to the touch surface 110 previously computed to the display apparatus 16.

When the processing unit 13 determines that the pointer touches the touch surface 110, the processing unit 13 computes the touch coordinate of the pointer relative to the touch surface 110 of the panel 11 according to the image position of the pointer and the image position of the mirror image of the pointer (i.e., the mirror image (not shown in FIG. 2A and FIG. 2B) generated by the reflective mirror 130) formed in the image captured. The processing unit 13 further controls the transmission unit 15 to transmit the information related to the touch coordinate computed to the display apparatus 16 to correspondingly control the movement of the cursor 161, to perform a writing operation, a selection operation, or the like.

The aforementioned preset pixel variance, the preset pixel ratio value, the preset pixel value difference, the preset average pixel value as well as the preset threshold can be pre-stored in the memory unit 14 for the processing unit 13 to read or access therefrom. The aforementioned preset pixel variance, the preset pixel ratio value, the preset pixel value difference, and the preset average pixel value may be configured according to the actual operation requirement of the optical touch system 1, such as touch sensitivity requirement or the sensitivity or the noise level of the image sensing apparatus 12.

Figure 3A:
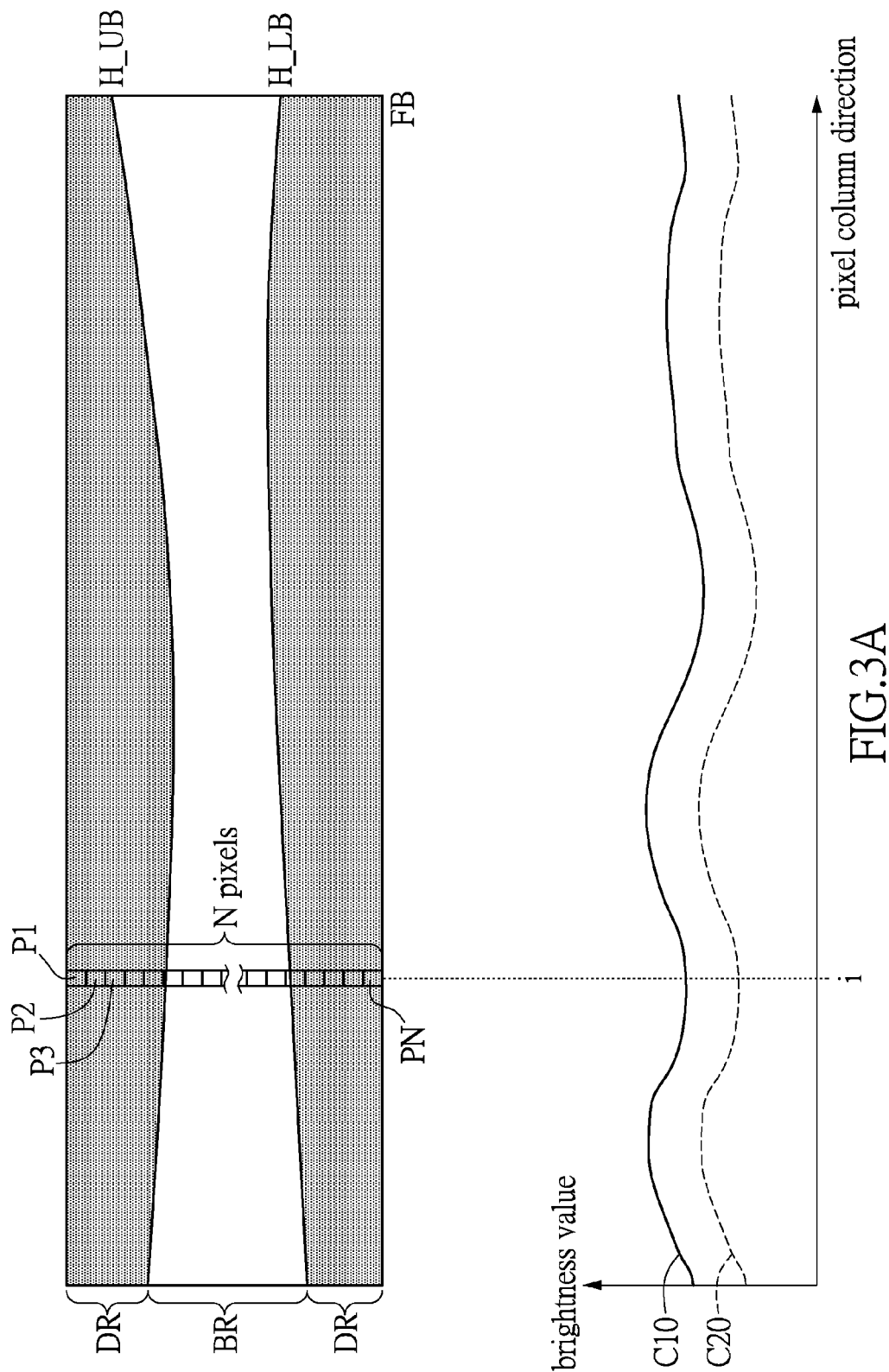
FIG. 3A shows a schematic diagram illustrating a background image captured by an image sensing apparatus and a brightness curve thereof provided in accordance to an exemplary embodiment of the present disclosure.
Figure 3B:
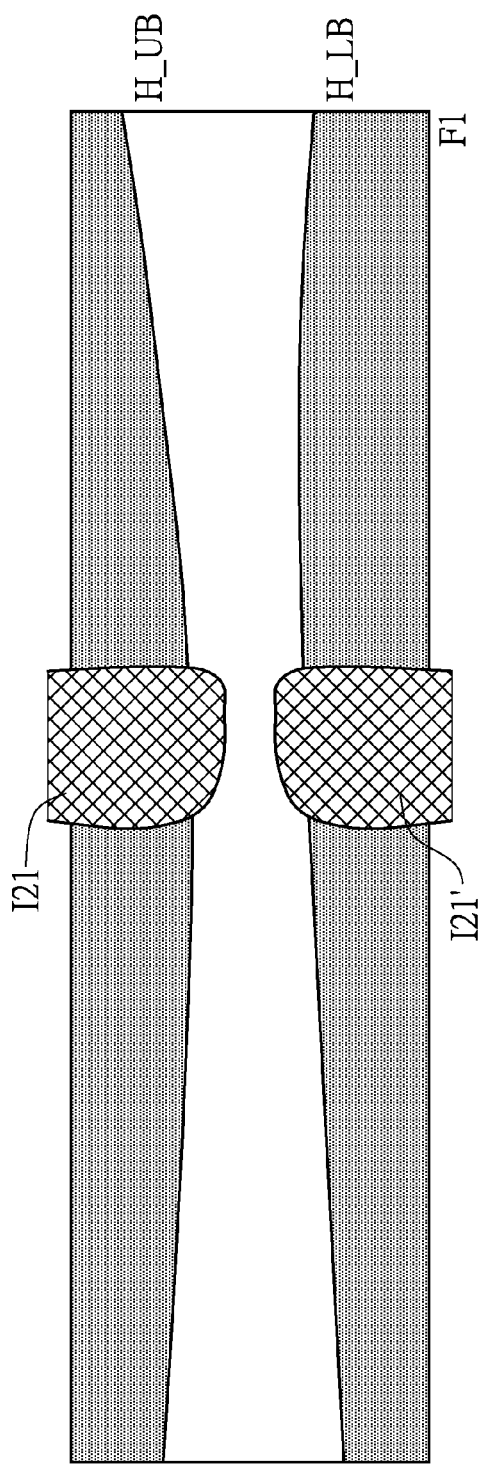
FIG. 3B is a schematic diagram depicting a 2D image containing an object image captured by an image sensing apparatus provided in accordance with an exemplary embodiment of the present disclosure.
Figure 3C:
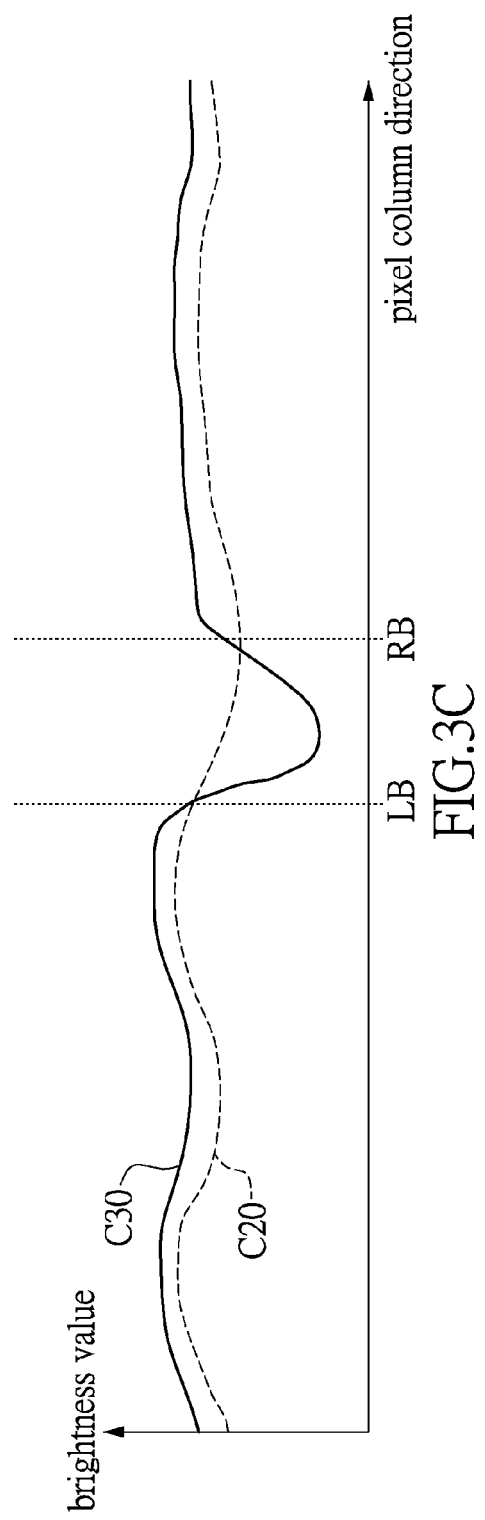
FIG. 3C is a diagram depicting a brightness curve that corresponds to the 2D image shown in FIG. 3B provided in accordance to an exemplary embodiment of the present disclosure.

Detailed descriptions regarding the capturing operation of the background image, the definition of the bright region BR and the image window IA are provided in the following paragraphs. Please refer to FIG. 3A~FIG. 3C in conjunction with FIG. 1. FIG. 3A shows a schematic diagram illustrating a background image captured by an image sensing apparatus and a brightness curve thereof provided in accordance to an exemplary embodiment of the present disclosure. FIG. 3B shows a schematic diagram illustrating a 2D image containing an object image captured by an image sensing apparatus provided in accordance with an exemplary embodiment of the present disclosure. FIG. 3C shows a diagram illustrating a brightness curve corresponding to the 2D image shown in FIG. 3B provided in accordance to an exemplary embodiment of the present disclosure. Curve C10 represents a background brightness curve of a background image FB. Curve C20 represents a predetermined brightness threshold curve which is derived from curve C10. Curve 30 represents the brightness curve of the image F1.

During the operation of the optical touch system 1, the processing unit 13 first drives the image sensing apparatus 12 to sense and capture the background image FB across the touch surface 110 before the pointer approaches or enters the touch sensing region TR, e.g., at the startup of the optical touch system 1. The background image FB includes a background region DR and a bright region DR. The background image FB has M×N pixels.

In one embodiment, the processing unit 13 can first compute the average brightness value of the background image FB. The processing unit 13 further sets a predetermined pixel value according to the average brightness value of the background image FB and a preset weighting factor (e.g., 1.2). The processing unit 13 compares the pixel value of each pixel in each pixel column of the background image FB with the predetermined pixel value thereafter to define an upper brightness bound H_UB and a lower brightness bound L_UB in each pixel column, so as to define the bright region BR in the background image FB. The pixel values lying between the upper brightness bound H_UB and the lower brightness bound H_LB are greater than the predetermined pixel value.

Additionally, the preset weighting factor may be configured according to a standard deviation of the average brightness value of the background image FB.

In another embodiment, the processing unit 13 may also compute the average pixel value of N pixels P1~PN for each pixel column. The processing unit 13 subsequently sets a predetermined pixel value for each pixel column according to the average pixel value of each respective and a preset weighting factor. The processing unit 13 compares the pixel value of each pixel in each pixel column of the background image FB with the predetermined pixel value thereafter and configures the area in each pixel column containing the most number of pixels with a pixel value greater than the predetermined pixel value to be the bright block of each respective pixel column. The processing unit 13 further defines an upper brightness bound H_UB and a lower brightness bound H_LB in each pixel column of the background image FB according to the bright block of each pixel column.

In further another embodiment, the processing unit 13 may first compute the average pixel value of N pixels P1~PN for each pixel column. The processing unit 13 then sets the predetermined pixel value according to the average pixel value of the pixel column having the largest average pixel value and a preset weighting factor. The processing unit 13 further defines the upper brightness bound H_UB and the lower brightness bound H_LB in each pixel column in the background image FB according to the predetermined pixel value.

The processing unit 13 transforms the background image FB into a background brightness curve (i.e., curve C10) to generate a background brightness curve data of the background image FB after having defined the bright region in the background image FB. Each brightness value depicted in curve C10 along the horizontal axis corresponds to the sum of brightness value of each respective pixel column in the bright region BR of the background image FB. In other words, the background brightness curve (i.e., curve C10) records the brightness distribution in the background image FB along the pixel column direction.

More specifically, the processing unit 13 can add up the pixel values of the pixels in each pixel column within the bright region BR of the background image FB. For instance, the brightness value of the ith pixel column depicted in curve C10 is the sum of the pixel values of the pixels of the ith pixel column in the bright region BR.

In another embodiment, the brightness values of the background brightness curve can be also obtained without having to identify the bright region BR. Particularly, the processing unit 13 can first select k pixels having high brightness (e.g., greater than a preset threshold) among N pixels of each pixel column in the background image FB and set the sum of the pixel values of the k pixels computed to be the pixel value of the respective pixel column (e.g., the ith pixel column), wherein k is an integer. Similarly, the processing unit 13 may also first select k1 pixels having high brightness (e.g., greater than a preset threshold) among N pixels of each pixel column in the background image FB and k2 pixels with darker brightness (e.g., less than the preset threshold) among N pixels of each pixel column in the background image FB, wherein k1 and k2 are integers. Next, the processing unit 13 computes the sum of the pixel difference between the k1 pixels and the k2 pixels to be the pixel value of the respective pixel column (e.g., the ith pixel column).

The processing unit 13 further can derive curve C20 from curve C10 to serve as the background brightness curve data for the background image FB. Curve 20 is the product of curve C10 and a preset percentage (e.g., 80%). That is, each brightness value of curve C20 is lower than each respective brightness value of curve C10 and is used as the background brightness curve data for providing appropriate brightness tolerance in the operation of sensing the touch state associated with the pointer and the touch position of the pointer.

The processing unit 13 operatively defines the bright region BR in the image (e.g., the image F1 of FIG. 2A) received from the image sensing apparatus 12 according to the background image FB as shown in FIG. 3B. The processing unit 13 further transforms the image F1 into the brightness curve (e.g., curve C30) to generate a brightness curve data of the image F1.

As shown in 3C, the processing unit 13 compares the curve C30 (i.e., the brightness curve of the image F1) with curve C20 to obtain the image positions of the object images I21 and I21. More specifically, the object image I21 and I21' are formed as a result of the pointer block a portion of light emitted or reflected by the light-emitting component 120, the reflective mirror 130, and the first reflecting unit 140. Therefore, the brightness value associated with each pixel column in curve C30 corresponding to the area containing object images I21 and I21' should be lower than the background brightness value of the respective pixel column in curve C20, and the brightness value associated with each pixel column in curve C30 in the rest of area should be higher than the background brightness value of the respective pixel column in curve C20.

Thus, the processing unit 13 can retrieve the image forming area associated with object images I21 and I21' in the image F1, i.e., obtaining the left boundary LB and the right boundary RB of object images I21 and I21 by comparing curve C30 and curve C20. Next, the processing unit 13 defines an image window (i.e., the image window IA of FIG. 2A) according to the bright region BR, the left boundary LB, and the right boundary RB. The processing unit 13 then determines whether the pointer placed in the touch sensing region TR is touching or hovering over the touch surface 110 by analyzing the brightness of the image window IA.

It is worth to note that the touch surface 110 may not be a reflecting mirror. As shown in FIG. 4A and FIG. 4B, images captured by the image sensing apparatus 12 across the touch surface 110 may include only the region encompassed by the reflective mirror 130, the first reflecting unit 140 and the second reflecting unit 150 and does not include the mirror image reflected from the touch surface 110. FIG. 4A~FIG. 4B show schematic diagrams respectively illustrating 2D images captured by the image sensing apparatus 12 provided in accordance to another exemplary embodiment of the present disclosure.

As shown in FIG. 4A, when the pointer (e.g., the finger 21) approaches the touch surface 110 of the panel 11, an image F3 captured the image sensing apparatus 12 only includes the bright region BR, the background region DR, and an object image I41 that corresponds to the tip of the finger 21 or the finger pulp of the finger 21 partially blocking or shielding a part of the reflective mirror 130, the first reflecting unit 140 or the second reflecting unit 150. The height of the bright region BR is determined by the reflective mirror 130, the first reflecting unit 140, and the second reflecting unit 150. The background region DR refers to the region that is outside the region encompassed by the reflective mirror 130, the first reflecting unit 140, and the second reflecting unit 150.

As shown in FIG. 4B, when the finger 21 contacts the touch surface 110, an object image I41 corresponding to the tip of the finger 21 of finger pulp of the finger 21 formed in an image F4 captured by the image sensing apparatus 12 will thus include the last pixel row of an image window IA' in the image F4. The processing unit 13 defines the image window IA (i.e., defining the left and right boundaries) in the bright region BR of the image F3 or F4 after received the image F3 or F4 from the image sensing apparatus 12, so as to analyze the brightness variance of the image window IA'. The processing unit 13 further determines whether the pointer is touching the touch surface 110 or hovering over the touch surface 110 according to the brightness analysis result of the image window IA'.

It is known in the art that the method or the algorithm employed by the optical touch system 1 in computing the position of pointer may vary according to the exact structure and operation method of the optical touch system 1, and is known art in the field. An exemplary method used by the processing unit 13 in the instant embodiment for computing the touch coordinate of the pointer placed in the touch sensing region TR relative to the touch surface 110 is provided in the following paragraph, however it shall be known that the present disclosure is not limited thereto.

Figure 5A:
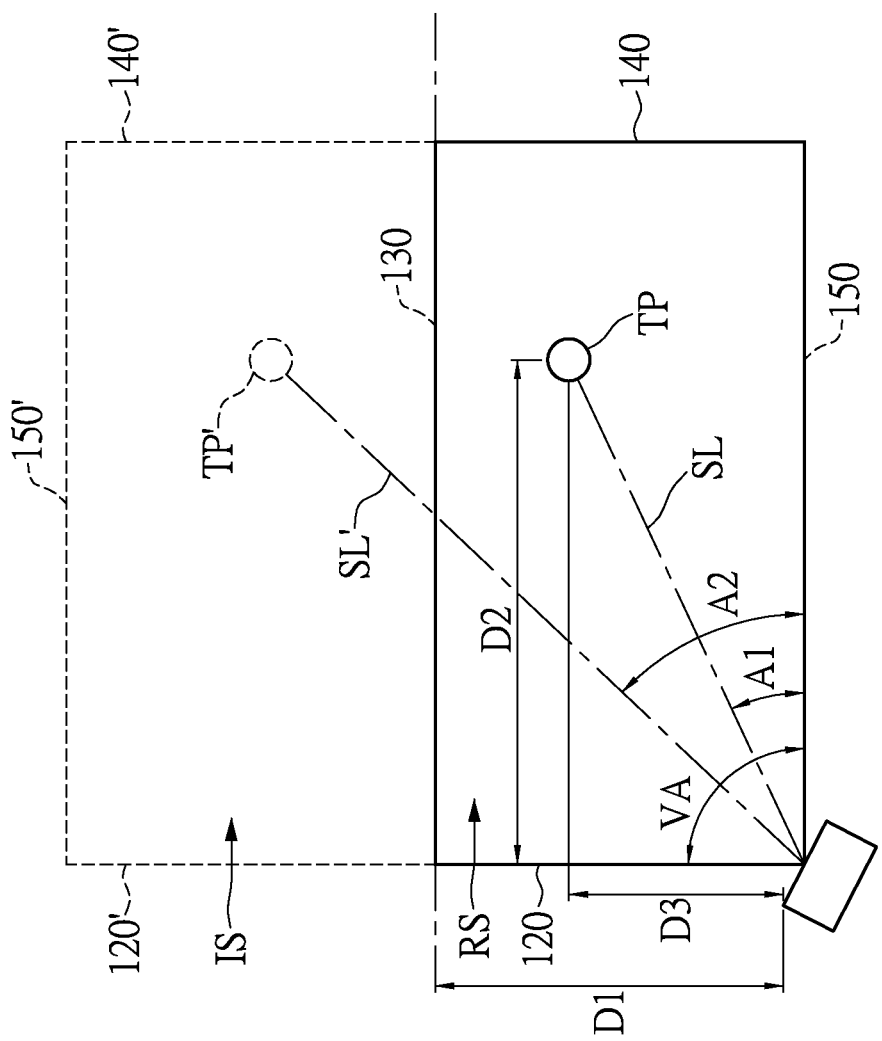
FIG. 5A is a diagram illustrating an operation of the optical touch system provided in accordance with an exemplary embodiment of the present disclosure.
Figure 5B:
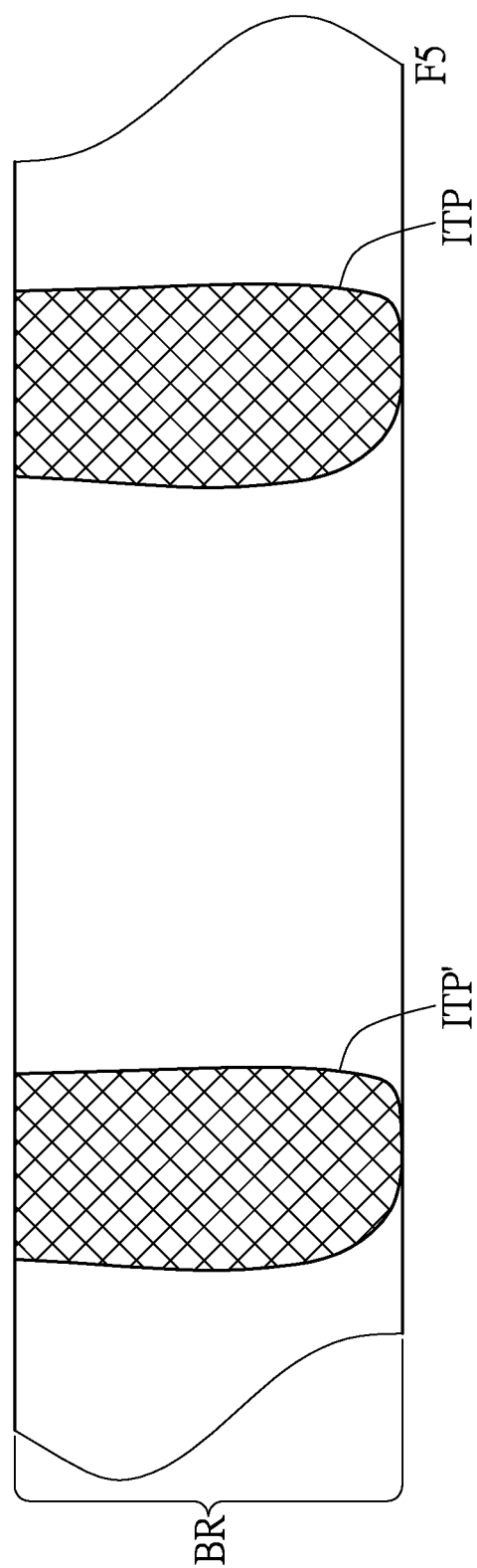
FIG. 5B is a diagram illustrating a part of an image captured by an image sensing apparatus provided in accordance to another exemplary embodiment of the present disclosure.

Please refer to FIG. 5A and FIG. 5B in conjunction with FIG. 1. FIG. 5A shows a diagram depicting an operation of the optical touch system provided in accordance to an exemplary embodiment of the present disclosure. FIG. 5B shows a diagram illustrating a part of an image captured by an image sensing apparatus that corresponds to the operation described in FIG. 5A provided in accordance to another exemplary embodiment of the present disclosure.

The reflecting surface of the reflective mirror 130 generates a first reflecting unit mirror image 140', a second reflecting unit mirror image 150', and a light-emitting component 120' by reflection. Specifically, as shown in FIG. 5A, the first reflecting unit 140 maps the first reflecting unit mirror image 140' with respect to the reflecting surface of the reflective mirror 130. The second reflecting unit 150 maps the second reflecting unit mirror image 150' with respect to the reflecting surface of the reflective mirror 130. The light-emitting component 120 maps the light-emitting component mirror image 120' with respect to the reflecting surface of the reflective mirror 130. The light-emitting component 120, the first reflective mirror 130, the first reflecting unit 140, and the second reflecting unit 150 collectively define a real space RS while the first reflecting unit mirror image 140', the second reflecting unit mirror image 150', and the light-emitting component 120' collectively define a virtual space IS. A touch point TP herein represents the touch position of the pointer touching the touch surface 110 in the real space RS and a touch point TP' represents the touch position of the pointer in the virtual space IS.

The transversal view VA of the image sensing apparatus 12 looks across the touch surface 110 and encompasses the real space RS and the virtual space IS. The image sensing apparatus 12 captures the real space RS, the virtual space IS, and the pointer (the finger 21 of FIG. 1) in the image sensing region TR and generates the image F5. As shown in FIG. 5B, the image F5 contains an object image ITP and an object image ITP', wherein the object image ITP is formed as the tip of the finger 21 or the finger pulp thereof blocking or shielding a portion of the light reflected or emitted from the light-emitting component 120, the reflective mirror 130, the first reflecting unit 140, the second reflecting unit 150, and/or the touch surface 110 and the object image ITP' is mirrored by the reflective mirror 130 via reflection.

Specifically, whenever a pointer, e.g., the finger 21 of FIG. 1, enters the touch sensing region TR in the real space RS, the image sensing apparatus 12 captures an image F5 corresponding to the pointer (e.g., the finger 21 of FIG. 1) following a first sensing path SL to form the object image ITP corresponding to the pointer in the image F5. At same time, the image sensing apparatus 12 also captures the mirror image of the pointer mapped in the virtual space IS with respect to the reflecting surface of the reflective mirror 130 following a second sensing path SL' to form the object image ITP' in the image F5.

The memory unit 14 is operable to pre-store the relation between one-dimensional positions of an object image (not shown) in a reference image FREF (not shown) captured and the included angles formed between the associated sensing paths and the second reflecting unit 150. The memory unit 14 can further pre-store a distance D1 between the second edge 113 of the touch surface 110 and the fourth edge 117 of the touch surface 110.

Accordingly, the processing unit 13 can respectively compute a first included angle A1 and a second included angle A2 according to one-dimensional positions (i.e., positions of the touch points TP, TP') of the object image ITP, ITP' in the image F5. The processing unit 13 can compute the two-dimensional coordinate of touch point associated with the pointer in the touch sensing region TR via triangulation to obtain the touch coordinate of the pointer relative to the touch surface 110.

More specifically, please refer to FIG. 1 again in conjunction with FIG. 5A, the touch surface 110 may be configure to have a rectangular coordinate system. The rectangular coordinate system has an origin located at the location of the image sensing apparatus 12. The second edge 113 of the touch surface 110 is configured to be the x-axis of the rectangular coordinate system and the first edge 111 of the touch surface 110 is configured to be the y-axis of the rectangular coordinate system. Accordingly, the position of the touch point TP that corresponds to the pointer in the rectangular coordinate system may be expressed as (D2, D3), wherein D2 denotes a distance to the first edge 111 from the position of the touch point TP, and D3 denotes a distance to the second edge 113 from the position of the touch point TP.

The processing unit 13 can first compute the first included angle A1 between the first sensing path SL and the second edge 113 of the touch surface 110 and the second included angle A2 between the second sensing path SL' and the second edge 113 of the touch surface 110. Particularly, the processing unit 13 can use Eq. (1) described below to compute D2, $$D2 = \frac{2H}{\tan A1 + \tan A2} \quad (1)$$

wherein D2 represents the distance between the position of the touch point TP and the first edge 111; H represents the height of the reflective mirror 130; A1 represents the first included angle form between the first sensing path SL and the second edge 113 of the touch surface 110; A2 represents the second included angle form between the second sensing path SL' and the second edge 113 of the touch surface 110.

The processing unit 13 computes D2·tan (A1) thereafter to obtain the y-axis coordinate of the touch point TP. The two-dimensional coordinate of the touch point TP can be expressed as (D2, D2·tan (A1)).

It is worth to mention that in practice, the image sensing apparatus 12 may further include a lens or lens module for adjusting the transversal view VA thereof such that the image captured by the image sensing apparatus 12 can completely encompassing both the real space RS and the virtual space IS.

Additionally, when the object image ITP corresponding to the pointer in the real space RS and the object image ITP' corresponding to the pointer in the virtual space IS (i.e., the mirror image of the object image ITP) overlap, the processing unit 13 may first obtain the individual image of the object image ITP associated with the real space RS and the object image ITP' associated with the virtual space IS, and then perform the touch coordinate computation thereafter. There are many methods for obtaining individual images that can be used by the present disclosure, which include but not limited to configure the illumination operation and the illumination structure of the optical touch system 1 such that no mirror image (i.e., the object image ITP') will form in the image captured by the image sensing apparatus 12, or isolate the lights that generate the mirror image and only project the object image ITP of the real space RS onto the image sensing apparatus 12, or shrinking the height of the object image ITP' of the virtual space IS and set the portion of the object image ITP that does not overlap with the object image ITP' as the object image ITP of the real space RS.

It shall be understood that as aforementioned, the method for computing or obtaining the position associated with the touch point in an optical touch system and those skilled in the art also know method of utilizing the triangulation computation method accompany with other position computation method, such as the computation method disclosed in the U.S. Pat. No. 8,269,158, to obtain the two-dimensional coordinate of the touch pointer. Hence, the method the instant embodiment is merely used to describe an exemplary method for computing the two-dimensional coordinate, and the present disclosure is not limited thereto.

Moreover, the processing unit 13 in the instant embodiment can be implemented by a processing chip such as a microcontroller or an embedded controller programmed with necessary firmware, however the present disclosure is not limited to the example provided herein. The memory unit 14 can be implemented by a volatile memory chip or a nonvolatile memory chip including but not limited to a flash memory chip, a read-only memory chip, or a random access memory chip. The transmission unit 15 can be configured to transmit the touch coordinate information to the display apparatus 16 in a wired or wireless manner, and the present disclosure is not limited thereto.

In another embodiment, when a passive light source, such as a reflective mirror, is used in place of the light-emitting component 120 of the optical touch system 1, at least a light-emitting element may be further disposed on the corners of the touch surface 110 (e.g., at the intersection between the first edge 111 and the second edge 113) such that the light-emitting component 120 and the reflective mirror 130 can reflect the light emitted from the light-emitting element and illuminate the touch surface 110 by reflection.

In one embodiment, the light-emitting component 120 may be fixedly positioned or mounted on the image sensing apparatus 12. For instance, the light-emitting component 120 may be integrated with the image sensing apparatus 12 by techniques such as sticking, screwing or fastening, so as to fixedly position or mount the light-emitting component 120 on the image sensing apparatus 12.

In another embodiment, the optical touch system 1 may not have the light-emitting component 120 and the image sensing apparatus 12 may have an illumination device (e.g., an infrared IR illumination device having an IR LED) disposed thereon. The image sensing apparatus 12 may further include a IR filter module (e.g., IR pass filter) such that the image sensing apparatus 12 captures the images of the touch surface 110 with the IR filter module.

The panel 11 of the optical touch system 1 and the display apparatus 16 in the instant embodiment are separate pieces, but in other embodiments, the panel 11 may be integrated with the screen of the display apparatus 16.

For instance, when the panel 11 is a touch screen (e.g., a transparent touch screen), the screen of the display apparatus 16 may be served or configured as the panel 11. The reflective mirror 130, the first reflecting unit 140, and the second reflecting unit 150 can be respectively disposed on the screen of the display apparatus 16.

As shown in FIG. 1, the panel 11 is rectangular shaped, and the light-emitting component 120, the reflective mirror 130, the first reflecting unit 140, and the second reflecting unit 150 are perpendicularly disposed on four sides of the panel 11. However, in another embodiment, the panel 11 may be made of any other geometric shapes such as a square or circular, and the light-emitting component 120, the reflective mirror 130, the first reflecting unit 140, and the second reflecting unit 150 may be disposed on the panel 11, accordingly.

It should be noted that the exact type, the exact structure and/or the exact implementation associated with the panel 11, the image sensing apparatus 12, the light-emitting component 120, the reflective mirror 130, the first reflecting unit 140, the second reflecting unit 150, the processing unit 13, the memory unit 14, the transmission unit 15, and the image sensing apparatus 16 may vary according to specific design (e.g., the exact type, the exact structure and/or the exact implementation) and/or operational requirement of the optical touch system 1, and should not be limited to the examples provided by the instant embodiment.

(An Exemplary Embodiment of an Object Analyzation Method of an Optical Touch System)

From the aforementioned exemplary embodiments, the present disclosure can generalize an object analyzation method for the optical touch system described in FIG. 1. The object analyzation method can determine whether the pointer is touching or hovering over the touch surface of the optical touch system according to the brightness variation in the image captured corresponding to the pointer by the image sensing apparatus.

Figure 6:
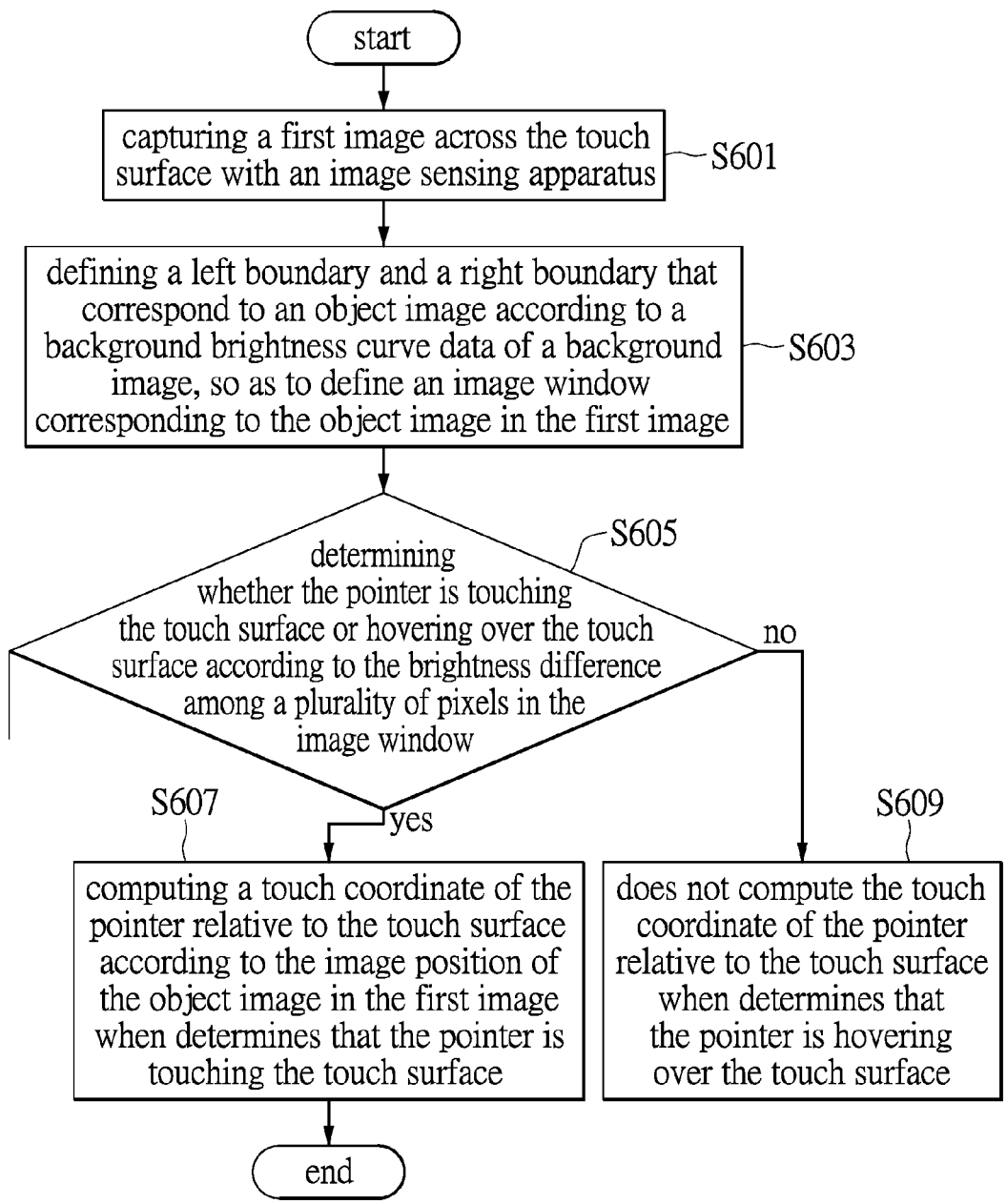
FIG. 6 is a flowchart diagram illustrating an object analyzation method of the optical touch system provided in accordance with an exemplary embodiment of the present disclosure.

Please refer to FIG. 6 in conjunction with FIG. 1 and FIG. 2A and FIG. 2B. FIG. 6 shows a flowchart diagram illustrating an object analyzation method of the optical touch system provided in accordance to another exemplary embodiment of the present disclosure. While the optical touch system 1 operates, the processing unit 13 drives the image sensing apparatus 12 to capture a plurality of images across the touch surface 110 of the panel 11 according to a predetermined frame rate, so as to determine the presence of a pointer on the touch surface. The predetermined frame rate may be configured according to the actual application and the operating environment (e.g., the surrounding brightness or the ambient light setting) associated with the optical touch system 1, and the instant embodiment is not limited thereto.

In Step S601, when the processing unit 13 drives the image sensing apparatus 12 to capture a first image across the touch surface 110, wherein the first image has an object image formed therein corresponding to the position of a pointer (e.g., a finger) on the touch surface 110, such as, the image F1 or the image F2 of FIG. 2A. The processing unit 13 further stores the pixelated data of the first image in the memory unit 14.

In Step S603, the processing unit 13 defines a left boundary LB and a right boundary RB that correspond to the object image in the first image according to a background brightness curve data of a background image pre-captured, so as to define an image window IA that corresponds to the object image in the first image.

More specifically, the processing unit 13 first defines a bright region BR in the first image according to the background image. The processing unit 13 subsequently transforms the first image into a brightness curve data. As described previously, the processing unit 13 may compute the sum of the pixel value of the plurality pixels in each pixel column inside the bright region BR of the first image, i.e., compute the sum of the brightness values for each pixel column inside the bright region BR, to generate the brightness curve data associated with the first image. The processing unit 13 compares the brightness curve data with the background brightness curve data to define the left boundary LB and the right boundary RB in the first image.

In Step S605, the processing unit 13 determines whether the pointer is touching the touch surface 110 or is hovering over the touch surface 110 according to the brightness difference among a plurality of pixels in the image window IA. When the processing unit 13 determines that pointer is touching the touch surface 110, the processing unit 13 executes Step S607. On the other hand, when the processing unit 13 determines that pointer is hovering over the touch surface 110, the processing unit 13 executes Step S609.

Specifically, when the brightness variance of the image window IA is computed to be relatively large, the processing unit 13 immediately determines that the pointer is hovering over the touch surface 110 and executes Step S609. When the brightness distribution of the image window IA is determined to be even i.e., the brightness variance of the image window IA is computed to be relatively small, the processing unit 13 immediately determines that the pointer is touching the touch surface 110 and executes Step S607.

In Step S607, the processing unit 13 computes a touch coordinate of the pointer relative to the touch surface 110 according to the image position of the pointer in the first image (i.e., the image position of the object image I21) and the image position of the mirror image of the pointer mirrored by the reflective mirror 130 in the first image when determines that the pointer is touching the touch surface 110. The processing unit 13 further controls the transmission unit 15 to transmit the touch coordinate information computed to the display apparatus 16 to correspondingly control the operation of the cursor 161 displayed on the display apparatus 16, such as controlling the cursor movement.

In Step S609, the processing unit 13 does not compute the touch coordinate of the pointer relative to the touch surface 110 when determines that the pointer is hovering over the touch surface 110.

Next, a number of specific embodiments are provided herein for illustrating the implementation of determining whether the pointer is touching or hovering over the touch surface 110.

In one embodiment, the processing unit 13 may first group the pixels in the image window IA based on the brightness of the pixels and determine whether the pointer is touching or hovering over the touch surface 110 according to the brightness difference between different brightness groups thereafter.

Figure 7:
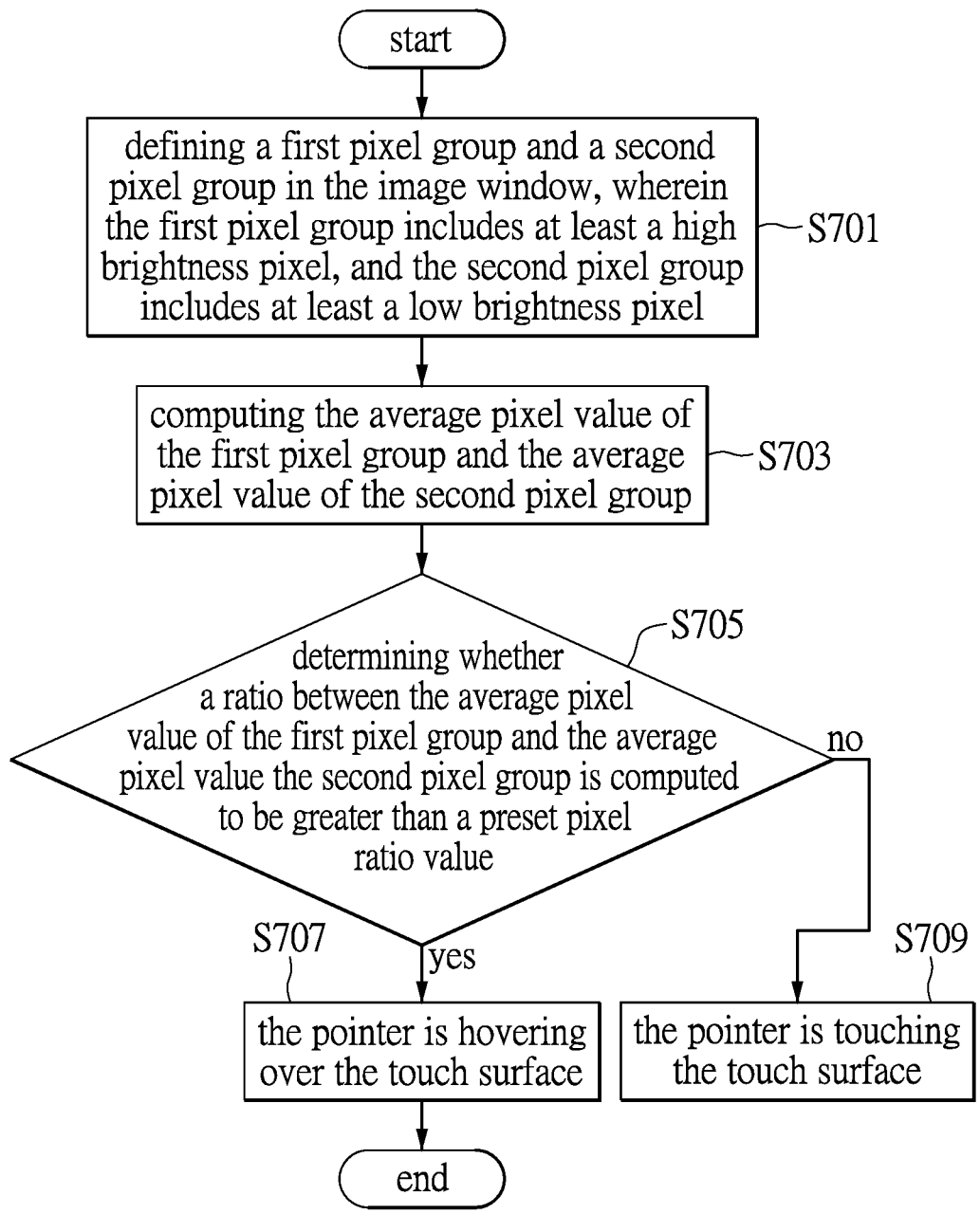
FIG. 7 is a flowchart diagram illustrating an object analyzation method of the optical touch system provided in accordance to another exemplary embodiment of the present disclosure.

Please refer to FIG. 7 in conjunction with FIG. 1, FIG. 2A and FIG. 2B. FIG. 7 shows an object analyzation method for an optical touch system provided in accordance to another exemplary embodiment of the present disclosure. The steps depicted in FIG. 7 can be executed by the processing unit 13 during the execution of Step 605 of FIG. 6.

In Step S701, the processing unit 13 defines a first pixel group and a second pixel group in the image window IA of the first image captured. The first and the second pixel groups are respectively defined for the processing unit 13 to analyze the difference in brightness of the image window IA. Particularly, the first pixel group includes at least a high brightness pixel, and the second pixel group includes at least a low brightness pixel. The high brightness pixel is the pixel in the image window IA having the pixel value larger than a preset threshold. The low brightness pixel is the pixel in the image window IA having the pixel value smaller than the preset threshold. The preset threshold may be configured according to the average brightness of the bright region BR in an image, e.g., 75%~90% of the average brightness of the bright region BR, and the instant embodiment is not limited thereto.

In Step S703, the processing unit 13 respectively computes the average pixel value of the first pixel group and the average pixel value of the second pixel group. Particularly, the processing unit 13 computes the average among the pixel values of the pixels in the first pixel group as the average pixel value of the first pixel group; the processing unit 13 computes the average among the pixel values of the pixels in the second pixel group as the average pixel value of the second pixel group.

In Step S705, the processing unit 13 determines whether the ratio between the average pixel value of the first pixel group and the average pixel value of the second pixel group is computed to be greater than a preset pixel ratio value (e.g., 1). To put it concretely, the processing unit 13 may first compute the average pixel values for the first pixel group and the second pixel group and compute the ratio between the average pixel value of the first pixel group and the average pixel value of the second pixel group thereafter. Then, the processing unit 13 compares the ratio computed between the average pixel values of the first pixel group and the second pixel group with the preset pixel ratio value.

When the processing unit 13 determines that the ratio between the average pixel value of the first pixel group and the average pixel value of the second pixel group is computed to be greater than a preset pixel ratio value (e.g., 1), the processing unit 13 executes S707; otherwise, the processing unit 13 executes Step S709.

In Step S707, when the ratio between the average pixel value of the first pixel group and the average pixel value of the second pixel group is greater than the preset pixel ratio value (e.g., 1) indicating that the brightness distribution in the image window IA of the first image is uneven, i.e., the brightness difference is relatively large, hence the processing unit 13 determines that the pointer does not contact the touch surface 110 and is hovering over the touch surface 110.

Figures 1, 15:
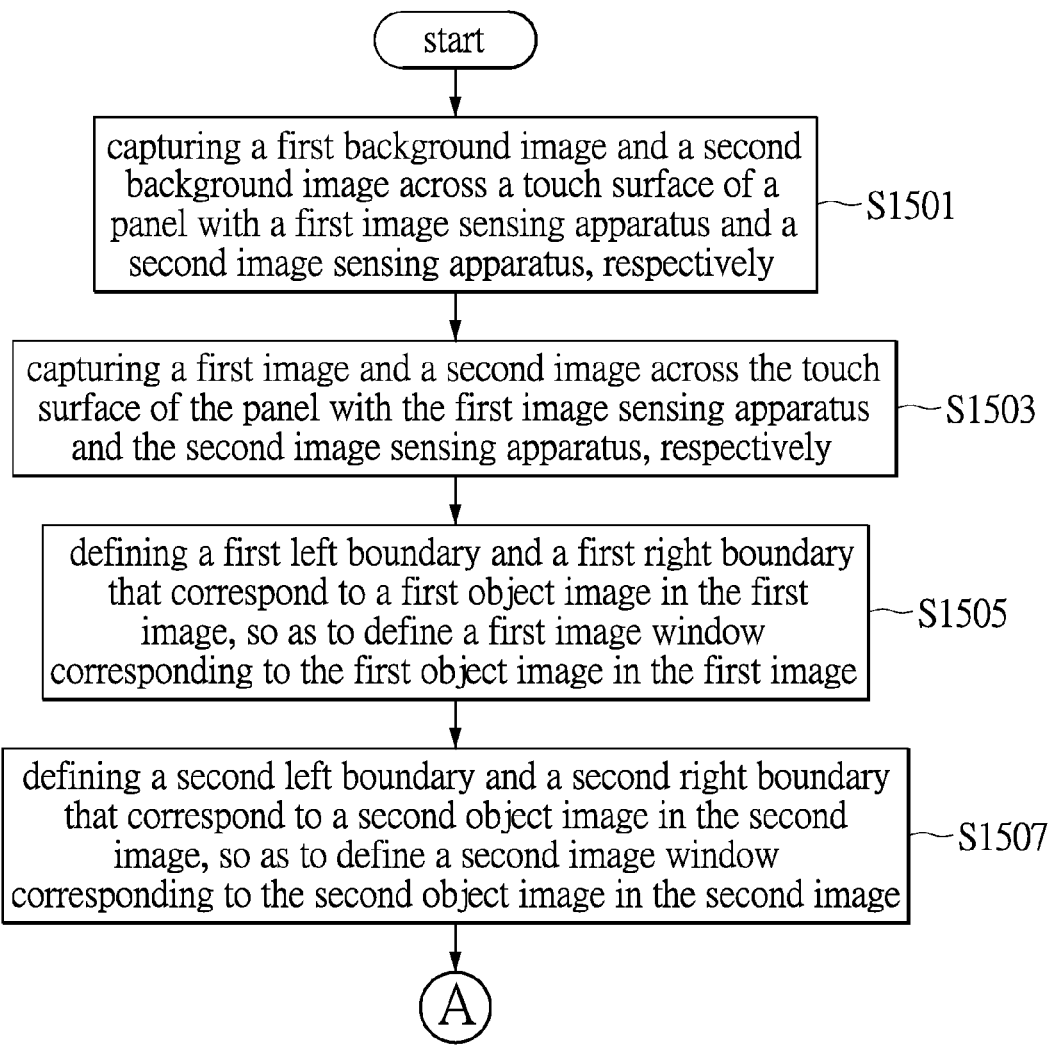
Figures 2, 15:
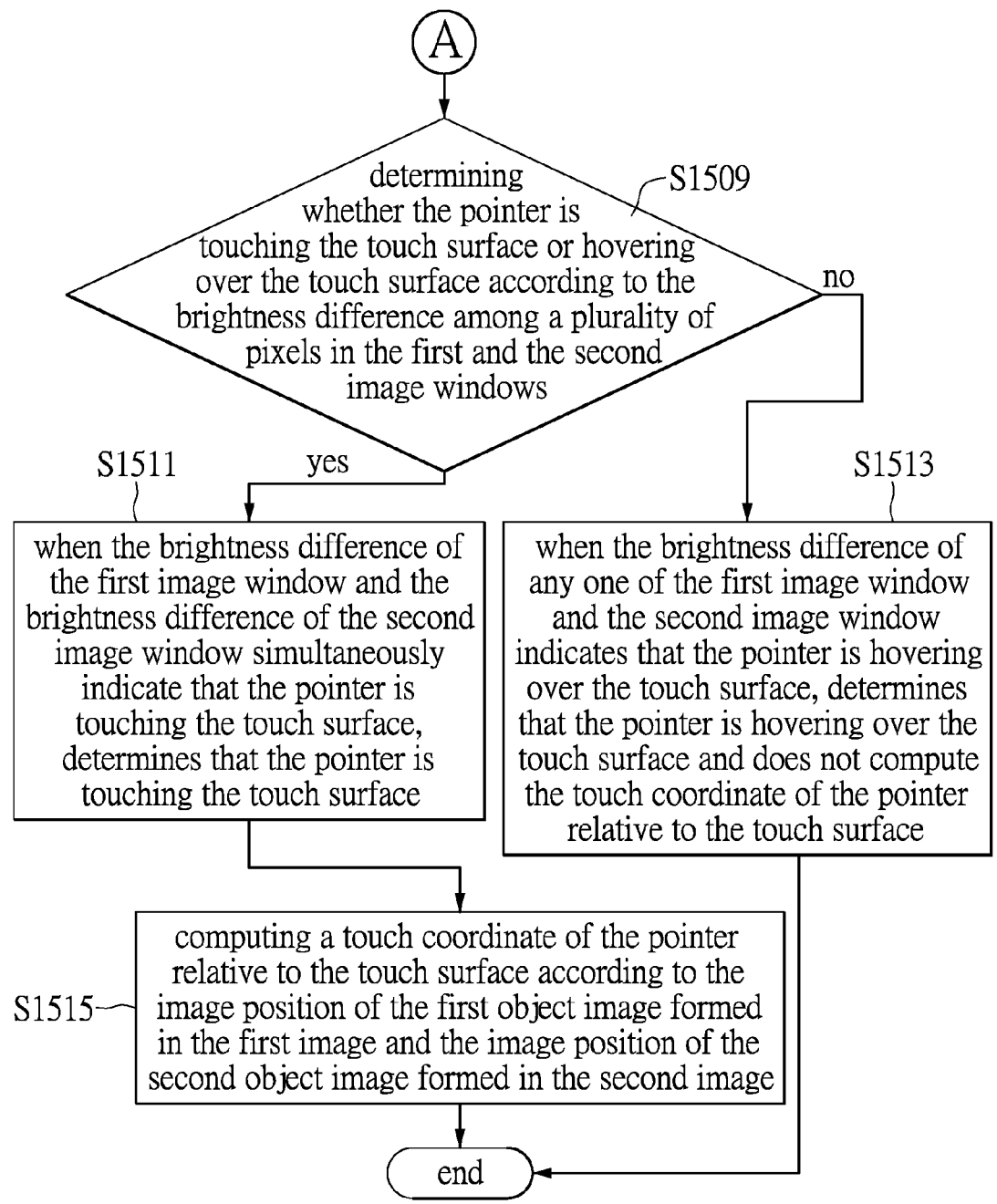

Taking FIG. 2 as the first image for example. When the pointer is hovering over the touch surface 110, the brightness distribution in the image window IA is uneven and the difference in brightness between the pixel having the largest pixel value and the pixel having the smallest pixel value is relatively large.

In Step S709, when the ratio between the average pixel value of the first pixel group and the average pixel value of the second pixel group is less than or equal to the preset pixel ratio value (e.g., 1) indicating that the brightness difference is relatively small and the brightness is evenly distributed in the image window IA of the first image, hence the processing unit 13 determines that the pointer is touching or in contact with the touch surface 110. The processing unit 13 further computes the touch coordinate of the pointer relative to the touch surface 110 of the panel 11 according to the image position of the pointer and the image position of the mirror image of the pointer in the first image for controlling the movement or the display position of the cursor 161 on the display apparatus 16.

For instance, please refer to FIG. 2B again, when the pointer is touching or in contact with the touch surface 110, the brightness distribution of the image window IA in the first image is substantially even and the difference in brightness between the pixel with the largest pixel value and the pixel with the smallest pixel value is relatively small, approaching to zero.

Accordingly the processing unit 13 can determine whether the pointer is touching or hovering over the touch surface 110 according to the brightness difference between the first pixel group and the second pixel group.

Figure 8:
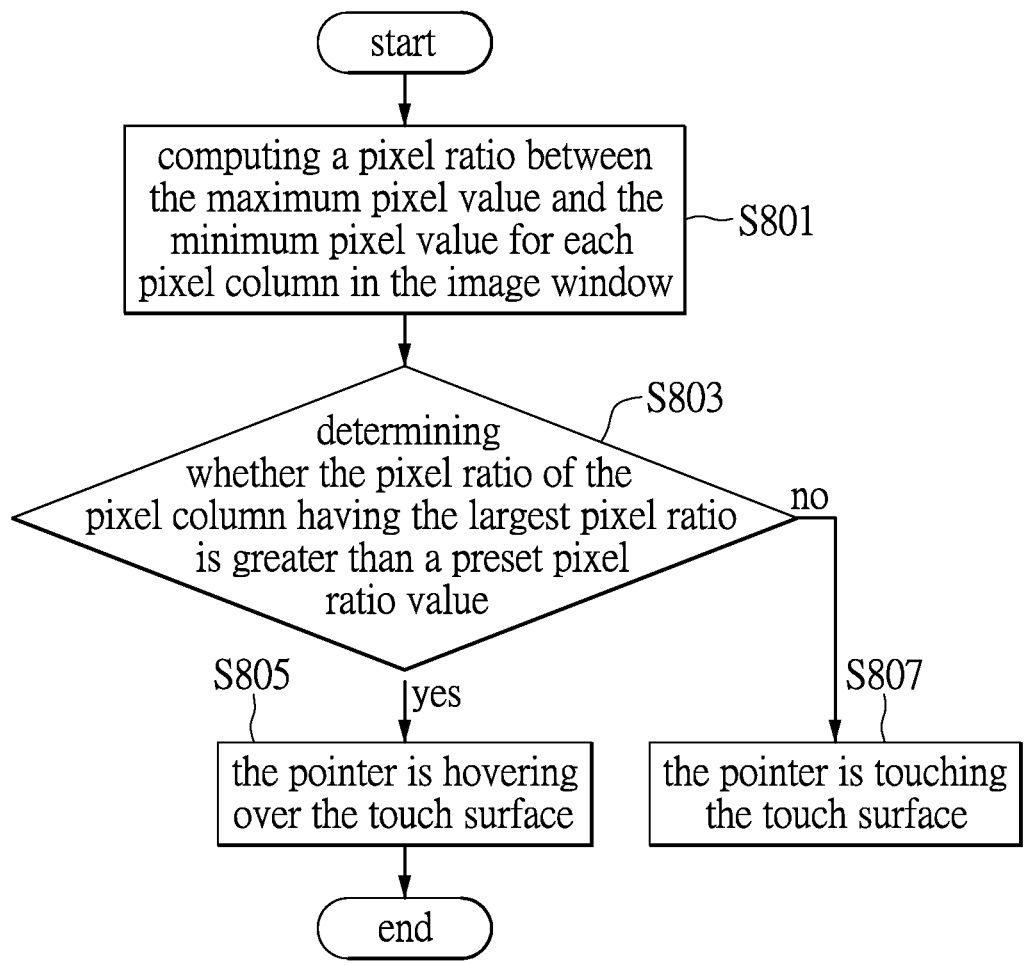
FIG. 8 is a flowchart diagram illustrating an object analyzation method of the optical touch system provided in accordance to another exemplary embodiment of the present disclosure.
Figure 9:
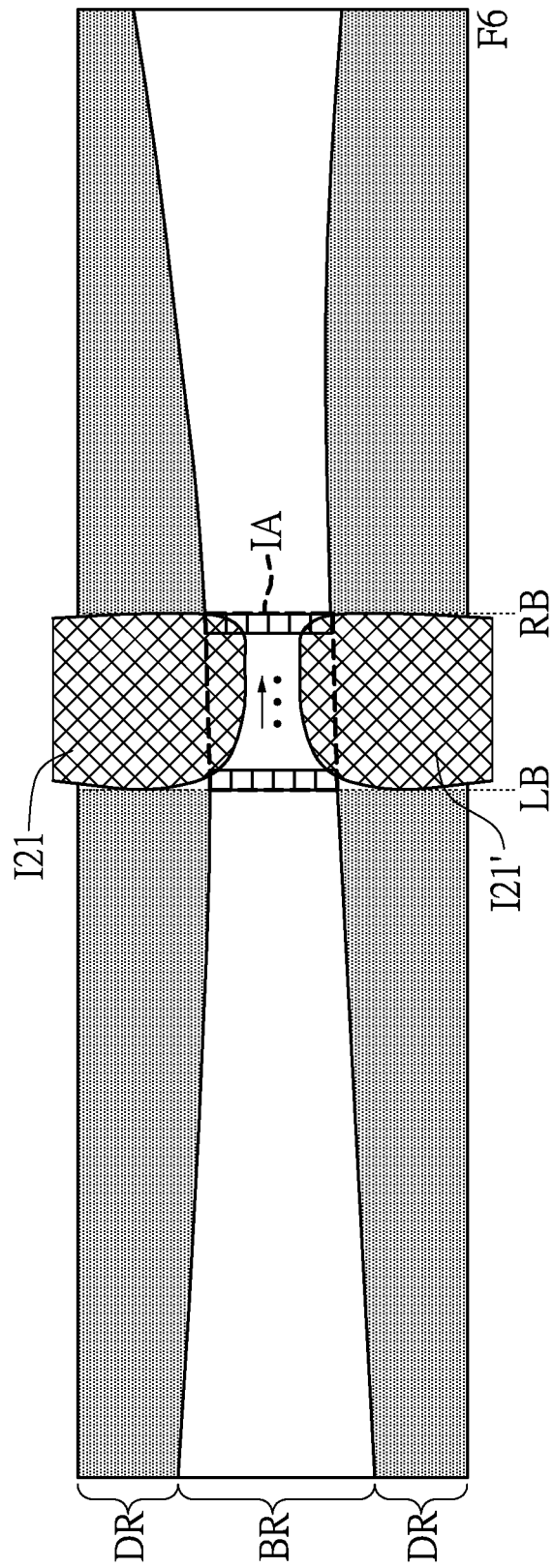
FIG. 9 is a schematic diagram depicting a 2D image containing an object image captured by an image sensing apparatus provided in accordance to an exemplary embodiment of the present disclosure.

In another embodiment, the processing unit 13 may determine whether the pointer is touching or hovering over the touch surface 110 by analyzing the variance among the pixels of each pixel column in the image window IA of the first image. Please refer to FIG. 8 and FIG. 9 in conjunction with FIG. 1 and FIG. 2B. FIG. 8 shows a flowchart diagram illustrating an object analyzation method of the optical touch system provided in accordance to another exemplary embodiment of the present disclosure. FIG. 9 shows a schematic diagram depicting a 2D image containing an object image captured by an image sensing apparatus provided in accordance to an exemplary embodiment of the present disclosure. The steps depicted in FIG. 8 may be executed by the processing unit 13 during the execution of Step 605 of FIG. 6.

In Step S801, the processing unit 13 computes a pixel ratio between the maximum pixel value and the minimum pixel value for each pixel column in the image window IA according to the first image (e.g., an image F6) captured by the image sensing apparatus 12. Particularly, the processing unit 13 sequentially computes the pixel ratio between the maximum pixel value and the minimum pixel value for each respective pixel column of the image window IA in a direction from the left boundary LB to the right boundary RB.

In Step S803, the processing unit 13 determines whether the pixel ratio of the pixel column in the image window IA having the largest pixel ratio is greater than the aforementioned preset pixel ratio value (e.g., 1). When the processing unit 13 determines that the pixel ratio of the pixel column having the largest pixel ratio is greater than the preset pixel ratio value (e.g. 1), the processing unit 13 executes Step S805; otherwise, the processing unit 13 executes Step S807.

In Step S805, the processing unit 13 determines that the pointer is hovering over the touch surface 110 as the brightness difference of the pixel column having the largest pixel ratio is too large. In Step S807, as the brightness difference of the pixel column having the largest pixel ratio is small, the processing unit 13 determines that the pointer is touching the touch surface 110.

Taking the image F6 of FIG. 9 as an example for illustration. Since the image area of the image window IA in the image F6 covered by the object images I21, I21' that correspond to the pointer is relatively small as shown in FIG. 9, the brightness difference is therefore significantly great. As a result, the pixel ratio of the pixel column having the largest pixel ratio is greater than the preset pixel ratio value and the processing unit 13 therefore determines that the pointer is hovering over the touch surface 110.

In contrast, when the first image captured by the image sensing apparatus 12 being the image F2 of FIG. 2B, since the image area of the image window IA in the image F2 covered by the object images I21, I21' formed corresponding to the pointer is relatively large, resulting in small brightness difference. As a result, the pixel ratio of the pixel column having the largest pixel ratio is less than or equal to the preset pixel ratio value, the processing unit 13 therefore determines that the pointer is touching the touch surface 110.

The processing unit 13 then computes the touch coordinate of the pointer relative to the touch surface 110 of the panel 11 according to the image position of the pointer and the image position of the mirror image of the pointer in the first image for controlling the movement or the display position of the cursor 161 on the display apparatus 16.

Figure 10:
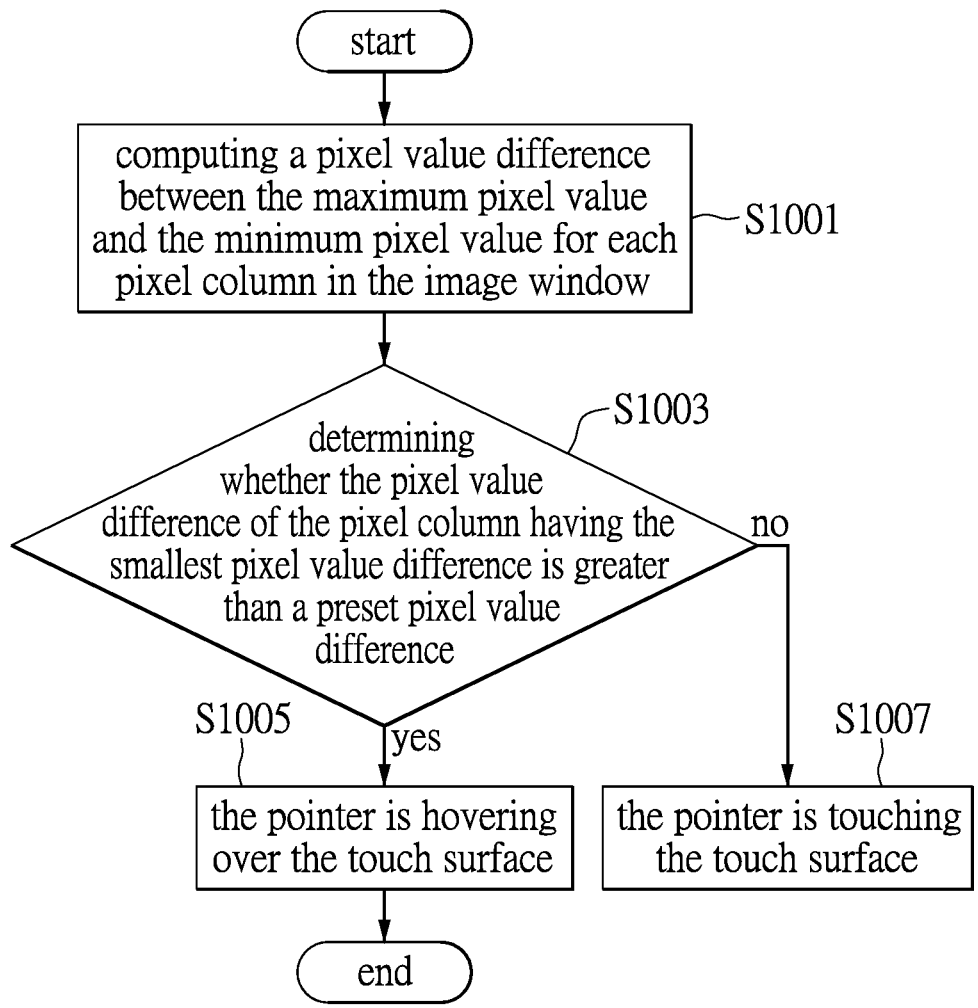
FIG. 10 is a flowchart diagram illustrating an object analyzation method of an optical touch system provided in accordance to another exemplary embodiment of the present disclosure.

In another embodiment, the processing unit 13 may determine whether the pointer is touching or hovering over the touch surface 110 by analyzing the pixel value difference between the maximum pixel value and the minimum pixel value of each pixel column in the image window IA of the first image. Please refer to FIG. 10 in conjunction with FIG. 9 and FIG. 2B. FIG. 10 shows a flowchart diagram illustrating an object analyzation method of the optical touch system provided in accordance to another exemplary embodiment of the present disclosure. The steps depicted in FIG. 10 may be executed by the processing unit 13 during the execution of Step 605 of FIG. 6.

In Step S1001, the processing unit 13 computes a pixel value difference between the maximum pixel value and the minimum pixel value for each pixel column in the image window IA of the first image according to the first image captured. The processing unit 13 sequentially computes the pixel value difference between the maximum pixel value and the minimum pixel value for each respective pixel column of the image window IA in a direction from the left boundary LB to the right boundary RB.

In Step S1003, the processing unit 13 determines whether the pixel value difference of the pixel column in the image window IA having the smallest pixel value difference is greater than a preset pixel value difference (e.g., 0). When the processing unit 13 determines that the pixel value difference of the pixel column having the smallest pixel value difference is greater than the preset pixel value difference (e.g., 0), the processing unit 13 executes Step S1005; otherwise, the processing unit 13 executes Step S1007.

In Step S1005, the processing unit 13 determines that the pointer is hovering over the touch surface 110 as the brightness difference of the pixel column having the smallest pixel value difference is too large. In Step S1007, the processing unit 13 determines that the pointer is touching the touch surface 110 as the brightness difference of the pixel column having the smallest pixel value difference is small.

Taking the image F6 of FIG. 9 as the first image for example. Since the image area of the image window IA of the image F6 covered by the object images I21, I21' corresponding to the pointer is relatively small as shown in FIG. 9, the brightness difference therefore is significantly great. As a result, the pixel value difference of the pixel column having the smallest pixel value difference is greater than the preset pixel value difference, and the processing unit 13 therefore determines that the pointer is hovering over the touch surface 110.

In contrast, when the first image captured by the image sensing apparatus 12 being the image F2 of FIG. 2B, as the image area of the image window IA in the image F2 covered by the object images I21, I21' corresponding to the pointer is relatively large, resulting in small brightness difference in any of the pixel column in the image window IA. As a result, the pixel value difference of the pixel column having the smallest pixel value difference is less than or equal to the preset pixel value difference, and the processing unit 13 therefore determines that the pointer is touching the touch surface 110.

Figure 11:
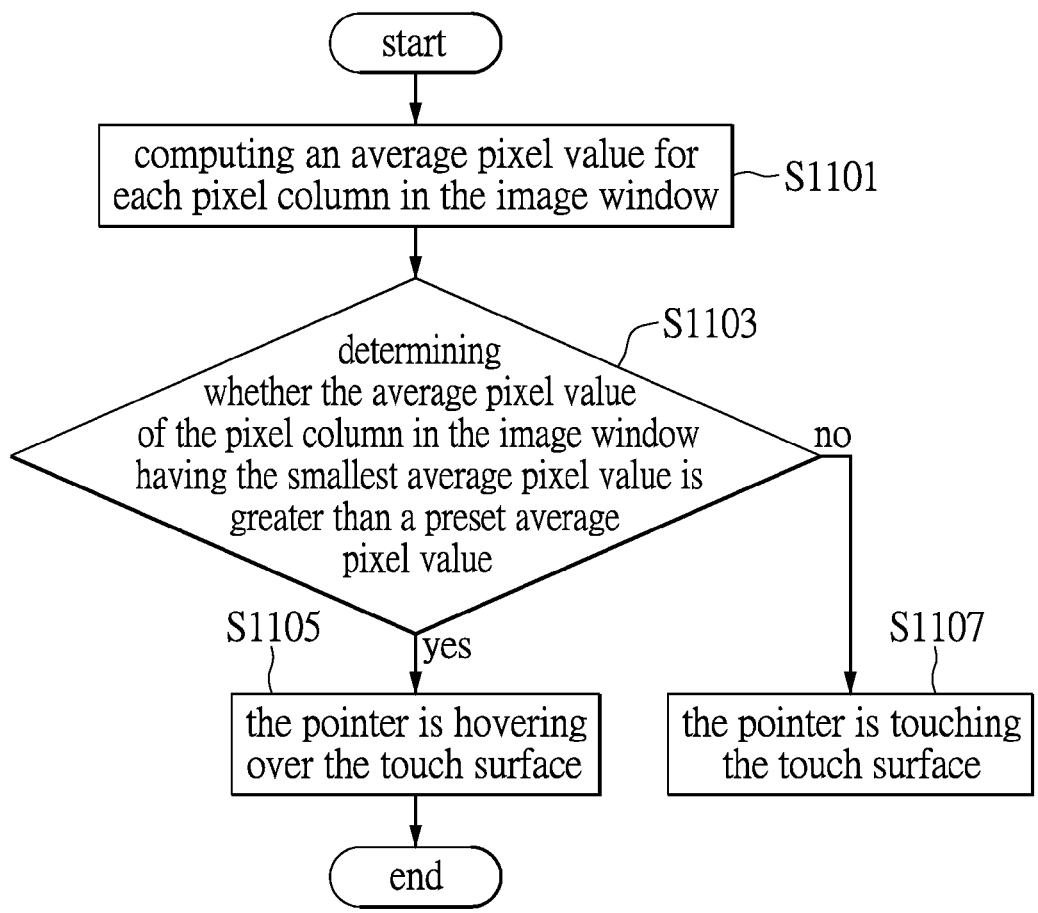
FIG. 11 is a flowchart diagram illustrating an object analyzation method of the optical touch system provided in accordance to another exemplary embodiment of the present disclosure.

In further another embodiment, the processing unit 13 may determine whether the pointer is touching or hovering over the touch surface 110 by analyzing the average pixel value (i.e., the average brightness value) of each respective pixel column in the image window IA of the first image. Please refer to FIG. 11 in conjunction with FIG. 9 and FIG. 2B. FIG. 11 shows a flowchart diagram illustrating an object analyzation method of the optical touch system provided in accordance to another exemplary embodiment of the present disclosure. The steps depicted in FIG. 11 may be executed by the processing unit 13 during the execution of Step 605 of FIG. 6.

In Step S1101, the processing unit 13 computes an average pixel value for each pixel column in the image window IA of the first image according to the first image (e.g., the image F6 of the FIG. 9) captured. The processing unit 13 computes the average pixel value sequentially for each respective pixel column of the image window IA of the first image in a direction from the left boundary LB to the right boundary RB.

In Step S1103, the processing unit 13 determines whether the average pixel window value of the pixel column in the image window IA of the first image having the smallest average pixel value is greater than a preset average pixel value (e.g., the average pixel value of any pixel column in the bright region of the background image). When the processing unit 13 determines that the average pixel value of the pixel column having the smallest average pixel value is greater than the preset average pixel value, the processing unit 13 executes Step S1105; otherwise, the processing unit 13 executes Step S1107.

In Step S1105, the processing unit 13 determines that the pointer is hovering over the touch surface 110 as the average pixel value of the pixel column having the smallest average pixel value is relative large, indicating that the brightness of the image window is high. In Step S1107 as the average pixel value of the pixel column having the smallest average pixel value is smaller indicating that the brightness of the image window is low, the processing unit 13 determines that the pointer is touching the touch surface 110.

Taking the image F6 of FIG. 9 as the first image for example. As the image area of the image window IA of the image F6 covered by the object images I21, I21' corresponding to the pointer is relatively small, hence, the overall brightness (or the sum of pixel value) of any pixel column in the image window IA of the image F6 will be significantly great. The average pixel value of the pixel column having the smallest average pixel value is greater than the preset average pixel value, the processing unit 13 thus determines that the pointer is hovering over the touch surface 110.

In contrast, when the first image captured by the image sensing apparatus 12 being the image F2 of FIG. 2B, since the image area of the image window IA in the image F2 covered by the object images I21, I21' corresponding to the pointer is relatively large, the brightness of any one of the pixel column in the image window IA of the image F6 will be low. The average pixel value of the pixel column in the image window IA of the image F6 having the smallest pixel value difference is less than the preset average pixel value, the processing unit 13 therefore determines that the pointer is touching the touch surface 110.

The aforementioned preset pixel ratio value, the preset pixel value difference, the preset average pixel value, and the preset threshold may be pre-designed in the processing unit 13 via firmware design based on the practical application. The aforementioned preset pixel ratio value, the preset pixel value difference, and the preset average pixel value may also pre-stored in the memory unit 14 for the processing unit 13 to read or access therefrom.

Additionally, the aforementioned preset pixel variance, the preset pixel ratio value, the preset pixel value difference, and the preset average pixel value may be configured according to the actual operation requirement of the optical touch system including but not limited to the touch sensitivity of pointer, the brightness generated by the light-emitting component, the sensitivity or the noise level of the image sensing apparatus, the surrounding brightness or the ambient light setting of the optical touch system 1. Based on the above explanation, those skilled in the art should be able to configure the preset pixel variance, the preset pixel ratio value, the preset pixel value difference, the preset average pixel value, and the preset threshold according to the actual needs or operation requirement for precisely defining the area of the image window to be analyzed. Hence, the present disclosure does not limit the implementation used for configuring the preset pixel variance, the preset pixel ratio value, the preset pixel value difference, and the preset average pixel value.

The object analyzation method of FIG. 6 and the analyzation methods of image window depicted in FIG. 7, FIG. 8, FIG. 10, and FIG. 11 can be respectively implemented by programming the corresponding program codes into the processing unit 13 (which can be implemented by a processing chip or a micro-controller) via firmware design and executed by the processing unit 13 during the operation of the optical touch system 1, however the present disclosure is not limited to thereto. Moreover, in practice, the processing unit 13 may sequentially execute the methods for determining the touch state of the pointer depicted in FIG. 7, FIG. 8, FIG. 10, and FIG. 11. FIG. 6, FIG. 7, FIG. 8, FIG. 10, and FIG. 11 are merely used for illustrating the implementation method of the object analyzation method and the present disclosure is not limited thereto.

Figure 12:
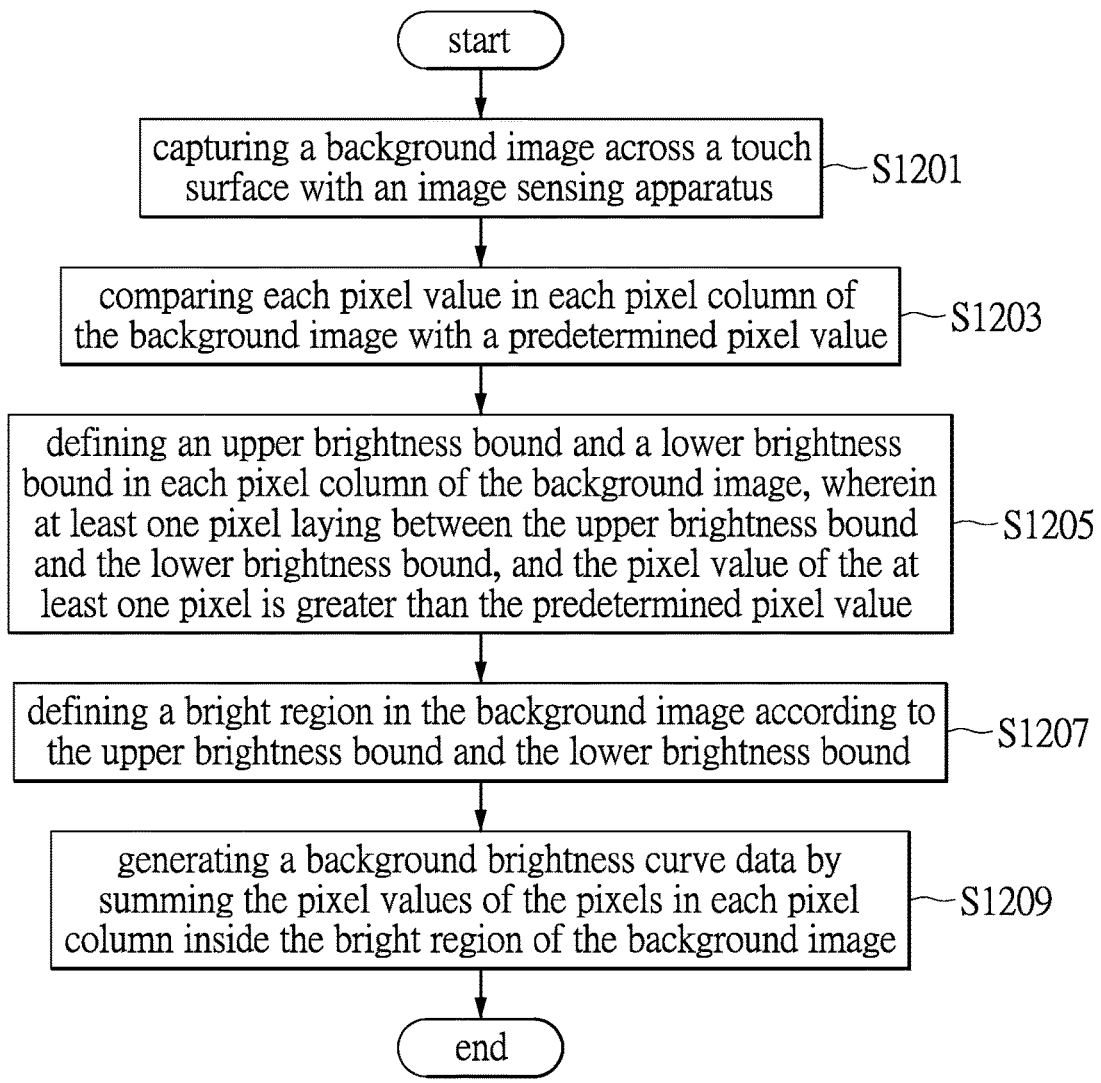
FIG. 12 is a flowchart diagram illustrating a method for defining a bright region in the background image captured provided in accordance to another exemplary embodiment of the present disclosure.

The present disclosure further provides the method of defining the bright region and the method of generating the background curve data. Please refer to FIG. 12 in conjunction with FIG. 1, FIG. 3A, and FIG. 3B. FIG. 12 shows a flowchart diagram illustrating a method for defining a bright region in the background image captured provided in accordance to another exemplary embodiment of the present disclosure.

In Step S1201, the processing unit 13 drives the image sensing apparatus 12 to capture a background image FB across the touch surface 110 before the pointer approaches or enters the touch sensing region TR, such as at the startup of the optical touch system 1. The background image FB includes background region DR and a bright region BR.

The height of the bright region BR is determined by the touch surface 110, the reflective mirror 130, the first reflecting unit 140, and the second reflecting unit 150. The background region DR encompasses the region outside the touch surface 110, the reflective mirror 130, the first reflecting unit 140, and the second reflecting unit 150 (including the real image and the mirror image of the touch sensing region TR)

In Step S1203, the processing unit 13 compares each pixel value in each pixel column of the background image FB with a predetermined pixel value. The predetermined pixel value may be configured according to the average brightness of the background image FB and a preset weighting factor (e.g., 1.2). The preset weighting factor may be configured according to the actual operation requirement of the optical touch system 1, such as the image sensing capability of the image sensing apparatus 12 or the surrounding light of the optical touch system 1. The processing unit 13 may also configure the predetermined pixel value for each pixel column according to the average pixel value of each respective and a preset weighting factor and the instant embodiment does not limited thereto.

In Step S1205, the processing unit defines an upper brightness bound H_UB and a lower brightness bound H_LB in each pixel column of the background image FB. At least one pixel lying between the upper brightness bound H_UB and the lower brightness bound H_LB wherein the pixel value of the at least one pixel value is greater than the predetermined pixel value.

More specifically, the processing unit 13 first compare the pixel value of each pixel of each pixel column in the background image FB with the predetermined pixel value and define the upper brightness bound H_UB and the lower brightness bound H_LB for each pixel column based on the area in each respective pixel column containing the most number of pixels with a pixel value greater than the predetermined pixel value thereafter.

In Step S1207, the processing unit 13 defines a bright region in the background image FB according to the upper brightness bound H_UB and the lower brightness bound H_LB.

In Step S1209, the processing unit 13 generates the background brightness curve data by summing the pixel values of the pixels in each pixel column inside the bright region BR of the background image FB. Specifically, the processing unit 13 computes the brightness value for each pixel column by adding up the pixel value of the pixels in each respective pixel column inside the bright region BR of the background image FB. The processing unit 13 further stores the background brightness curve data in the memory unit 14.

In another embodiment, the processing unit 13 may also generate a background brightness curve with lower brightness according to a preset percentage (e.g., 80%) for providing appropriate brightness tolerance. The processing unit 13 then generates the background brightness curve data according to the background brightness curve computed.

The method or algorithm for defining the bright region and generating the background brightness curve data depicted in FIG. 12 can be implemented by programming the corresponding program codes into the processing unit 13 (which can be implemented by a processing chip or a micro-controller) via firmware design and executed by the processing unit 13 during the operation of the optical touch system 1, however the present disclosure is not limited to thereto.

(Another Exemplary Embodiment of an Optical Touch System)

Figure 13:
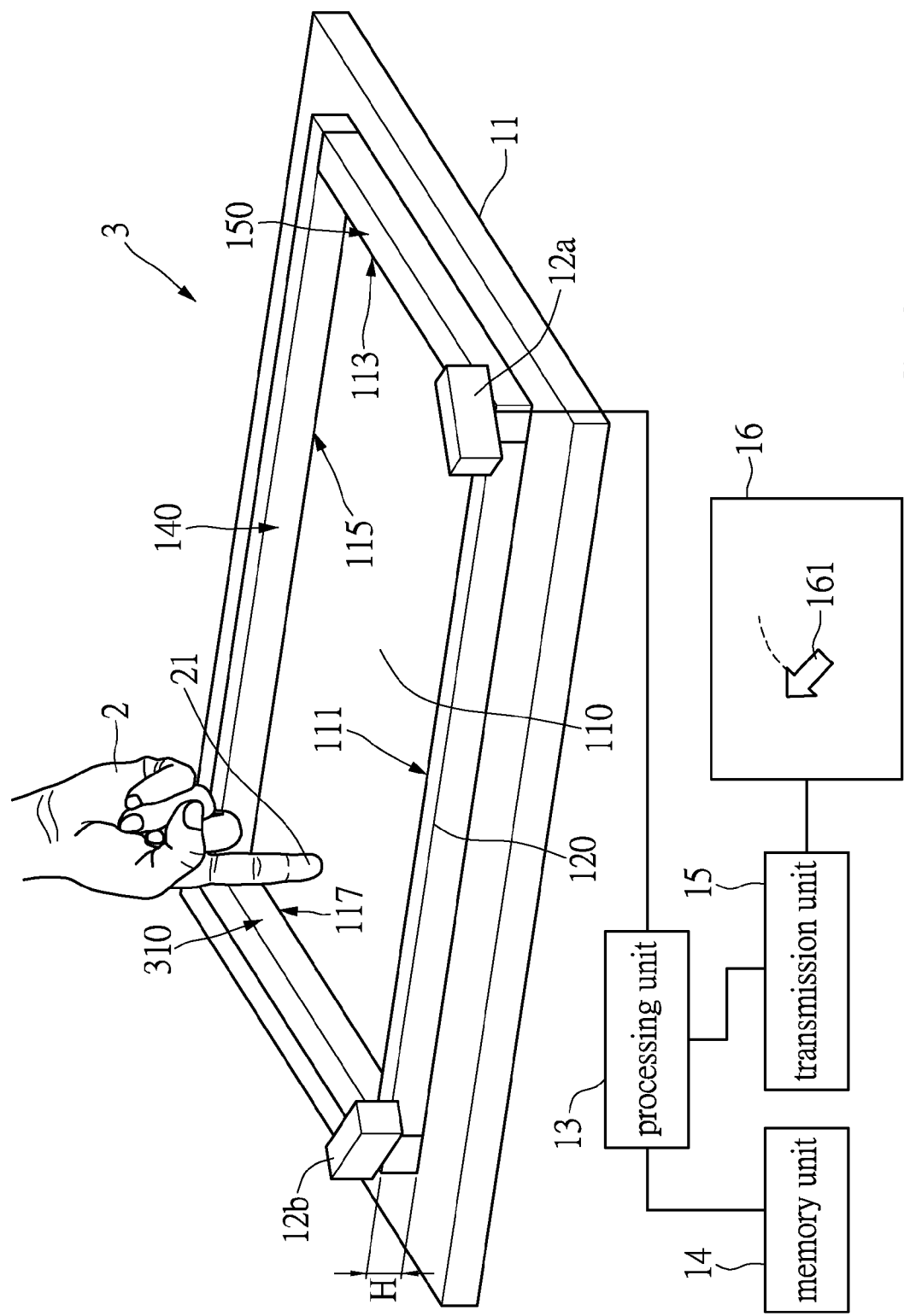
FIG. 13 is a diagram of an optical touch system provided in accordance to another exemplary embodiment of the present disclosure.
Figure 14A:
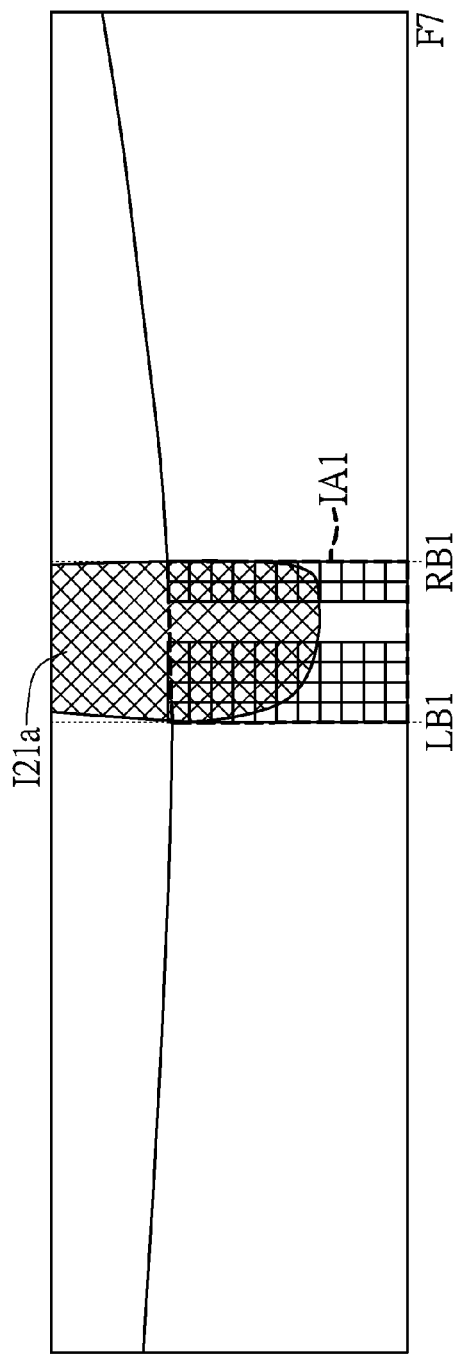
FIG. 14A~FIG. 14B are schematic diagrams respectively illustrating images having object images captured by an image sensing apparatus provided in accordance to another exemplary embodiment of the present disclosure.
Figure 14B:
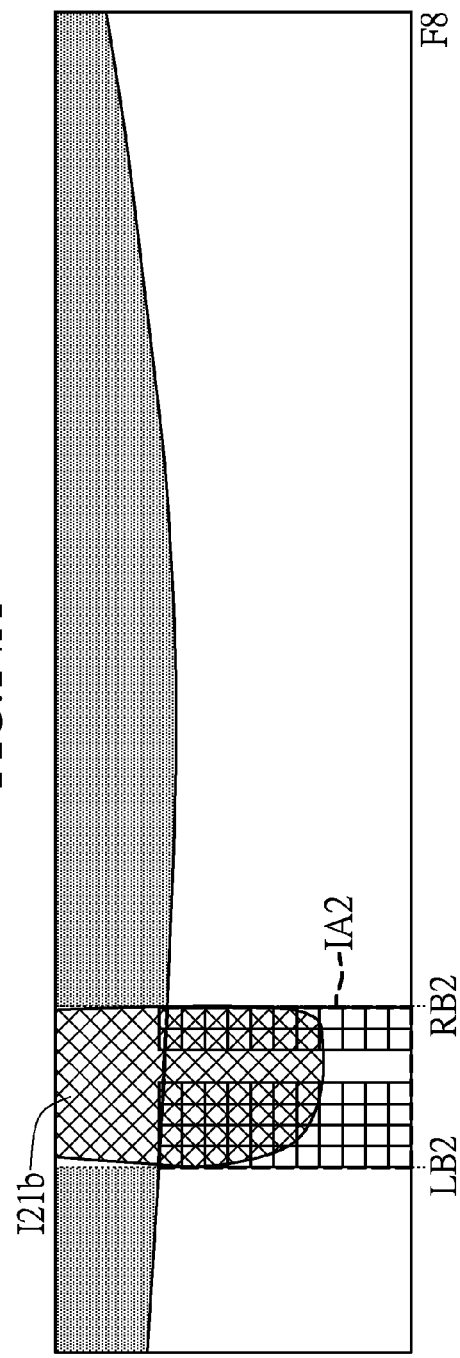

Please refer to FIG. 13, FIG. 14A and FIG. 14B. FIG. 13 shows a diagram illustrating an optical touch system provided in accordance to another exemplary embodiment of the present disclosure. FIG. 14A~FIG. 14B show schematic diagrams respectively illustrating images having object images captured by an image sensing apparatus provided in accordance to another exemplary embodiment of the present disclosure.

The difference between an optical touch system 3 of FIG. 13 and the optical touch system 1 of FIG. 1 is that the optical touch system 3 includes two image sensing apparatuses, i.e., a first image sensing apparatus 12a and a second image sensing apparatus 12b, to prevent the occurrence of false detection problems due to the dead zone or blind spots associated with the position of a single image sensing apparatus or the position of the light emitting component. Moreover, the optical touch system 3 uses a third reflecting unit 310 in place of the reflective mirror 130 of FIG. 1. The region surrounded by the touch surface 110, the light-emitting component 120, the first reflecting unit 140, the second reflecting unit 150, and the third reflecting unit 310 forms a touch sensing region TR of the optical touch system 3. The touch sensing region TR of the optical touch system 3 has a height H, wherein the height H may be configured based on the exact structure of the optical touch system 3 and the operation requirement thereof.

More specifically, the first image sensing apparatus 12a is disposed at a first corner formed between the first edge 111 of the touch surface 110 and the second edge 113 of the touch surface 110. The second image sensing apparatus 12b is disposed at a second corner formed between the first edge 111 of the touch surface 110 and the fourth edge 117 of the touch surface 110. The first image sensing apparatus 12a and the second image sensing apparatus 12b are respectively disposed at different locations on the touch surface 110. The sensing area of the first image sensing apparatus 12a and the sensing area of the second image sensing apparatus 12b are configured to be overlapped, so as to enhance the touch recognition rate of the optical touch system 3.

The first image sensing apparatus 12a and the second image sensing apparatus 12b respectively capture images across the touch surface 110 and may or may not include the touch surface 110. The longitudinal field of view of the first and the second image sensing apparatuses 12a, 12b are preferably configured to be larger than the height of the touch sensing region TR for completely capturing the image of the pointer.

In the instant embodiment, the touch surface 110 is a non-reflecting surface and does not generate mirror image. Accordingly, the images capture by the first image sensing apparatus 12a and the second image sensing apparatus 12b across the touch surface include only the region surrounded by the first reflecting unit 140, the second reflecting unit 150 and the third reflecting unit 310 and does not include the mirror image reflected from the touch surface 110.

Briefly, the processing unit 13 can drive the first image sensing apparatus 12a and the second image sensing apparatus 12b to capture a plurality of images across the touch surface 110 respectively according to a predetermined frame rate. The processing unit 13 operatively detects the presence of the pointer and the operation thereof according to the images captured, i.e., detecting whether the finger 21 of the user 2 or a stylus has entered the touch sensing region TR and the touching operation of the pointer in the touch sensing region TR.

More specifically, a first image F7 captured by the first image sensing apparatus 12a will have an object image I21a formed therein corresponding the pointer (e.g., the tip of the finger and the finger pulp of the finger 21) blocking a portion of light in view of the first image sensing apparatus 12a. A second image F8 captured by the second image sensing apparatus 12b will have an object image I21b formed therein in corresponding the pointer (e.g., the tip of the finger and the finger pulp of the finger 21) blocking a portion of light in view of the second image sensing apparatus 12b. Each of the first image F7 and the second image F8 includes a bright region BR and a background region DR, wherein the method of defining the bright region BR in the image captured is described in details hereinabove, hence further descriptions are hereby omitted.

The processing unit 13 can operatively determine whether the pointer is touching the touch surface 110 or is hovering over the touch surface 110 according to the sensing results generated by the first image sensing apparatus 12a and the second image sensing apparatus 12b, i.e., the first image F7 and the second image F8.

When the sensing result of the first image sensing apparatus 12a and the sensing result of the second image sensing apparatus 12b simultaneously indicate that the pointer is touching the touch surface 110, the processing unit 13 determines that the pointer is touching the touch surface 110. When the sensing result of either the first image sensing apparatus 12a or the second image sensing apparatus 12b indicates that the pointer is hovering over the touch surface 110, the processing unit 13 determines that the pointer is hovering over the touch surface 110.

When the processing unit 13 determines that the pointer is touching the touch surface 110, the processing unit 13 computes a touch coordinate of the pointer (e.g., the finger 21) relative to the touch surface 110 according to the image position of the pointer formed the first image F7 and the image position of the pointer formed the second image F8. The processing unit 13 further controls the transmission unit 15 to transmit the touch coordinate information computed to the display apparatus 16 to correspondingly control the operation of the cursor 161 displayed on the display apparatus 16.

In order to clearly understand the operation of the optical touch system 3, the instant embodiment further discloses an object analyzation method for the optical touch system 3. Please refer to FIG. 15-1 and FIG. 15-2 in conjunction with FIG. 13, FIG. 14A, and FIG. 14B. FIG. 15-1 and FIG. 15-2 show flowchart diagrams respectively illustrating an object analyzation method of an optical touch system provided in accordance to an exemplary embodiment of the present disclosure.

In Step S1501, the processing unit 13 drives the first image sensing apparatus 12a and the second image sensing apparatus 12b to respectively capture a first background image FB1 (not shown) and a second background image FB2 (not shown) across the touch surface 110 of the panel 11 before a pointer enters the touch sensing region TR, e.g., at the startup of the optical touch system 3 or before detected the presence of the pointer.

In Step S1503, the processing unit 13 drives a first image sensing apparatus 12a and the second image sensing apparatus 12b to respectively capture a first image F7 and a second image F8 across the touch surface 110. The first image F7 has a first object image I21a formed therein corresponding to the position of the pointer (e.g., the tip of the finger 21 and the finger pulp of the finger 21) on the touch surface 110 with respect to the first image sensing apparatus 12a. The second image F8 has a second object image I21b formed therein corresponding to the position of the pointer on the touch surface 110 with respect to the second image sensing apparatus 12b.

In Step S1505, the processing unit 13 defines a first left boundary LB1 and a first right boundary RB1 that correspond to the first object image I21a in the first image F7 by comparing the first image F7 with the first background image FB1, so as to define a first image window IA1 corresponding to the first object image I21a in the first image F7.

In Step S1507, the processing unit 13 defines a second left boundary LB2 and a second right boundary RB2 that correspond to the second object image I21b in the second image F8 by comparing the second image F8 with the second background image FB2, so as to define a second image window IA2 corresponding to the second object image I2b in the second image F8.

In Step S1509, the processing unit 13 determines whether the pointer is touching the touch surface 110 or hovering over the touch surface 110 according to the brightness difference among a plurality of pixels in the first image window IA1 and the second image window IA2, respectively.

In Step S1511, when the processing unit 13 determines that the brightness difference of the first image window IA1 and the brightness difference of the second image window IA2 simultaneously indicate that the pointer is touching the touch surface 110, the processing unit 13 determines that the pointer is touching the touch surface 110 and executes Step S1515.

In Step S1513, when either the brightness difference of the first image window IA1 or the brightness difference of the second image window IA2 indicates that the pointer is hovering over the touch surface 110, the processing unit 13 determines that the pointer is hovering over the touch surface 110 and the processing unit 13 does not compute the touch coordinate of the pointer relative to the touch surface 110.

In one embodiment, the processing unit 13 may determine whether the pointer is touching the touch surface 110 or is hovering over the touch surface 110 according to the brightness difference between a first pixel group and a second pixel group defined in the first image window IA1 and the brightness difference between a third pixel group and a fourth pixel group defined in the second image window IA2.

The first pixel group and the third pixel group respectively include at least a high brightness pixel, while the second pixel group and the fourth pixel group respectively include at least a low brightness pixel. The high brightness pixel is the pixel in the first image window IA1 or the second image window IA2 having pixel value larger than a preset threshold. The low brightness pixel is the pixel in the first image window IA1 or the second image window IA2 having pixel value smaller than the preset threshold.

In another embodiment, the processing unit 13 may determine whether the brightness distribution of the first image window IA1 or the second image window IA2 is even, or whether the brightness difference of in the first image window IA1 and the second image window IA2 is too large by computing the pixel ratio between the maximum and the minimum pixel values for each pixel column in the first or the second image window IA1, IA2 defined, or by computing the pixel value difference between the maximum pixel value and the minimum pixel value for each pixel column in the first or the second image window IA1, IA2 defined, or by computing the average pixel value of each pixel column in the first or the second image window IA1, IA2.

When the processing unit 13 determines that the brightness distribution of either the first image window IA1 or the second image window IA2 is uneven or the brightness difference of either the first image window IA1 or the second image window IA2 is relatively large (i.e., the difference between the maximum pixel value and the minimum pixel value is relatively large), the processing unit 13 determines that the pointer is hovering over the touch surface 110.

When the processing unit 13 determines that both the brightness distribution of the first image window IA1 and the brightness distribution of the second image window IA2 are even or the brightness difference of either the first image window IA1 or the second image window IA2 is very small (i.e., the difference between the maximum pixel value and the minimum pixel value for both the first image window IA1 and the second image window IA2 is relatively small), the processing unit 13 determines that the pointer is touching the touch surface 110.

In Step S1515, the processing unit 13 computes a touch coordinate of the pointer relative to the touch surface 110 according to the image position of the first object image I21a formed in the first image F7 and the image position of the second object image I21b formed in the second image F8. The processing unit 13 further controls the transmission unit 15 to transmit the touch coordinate computed to the display apparatus 16 to correspondingly control the movement of the cursor 161, so as to perform writing operations, selection operation, or the like.

The processing unit 13 can also compute the touch coordinate using triangulation technique, and details on the computation of the touch coordinate have been described previously in the aforementioned embodiments and are known arts in the field, hence further description are hereby omitted.

It is worth to note that the first image sensing apparatus 12a and the second image sensing apparatus 12b can be implemented by a charge-coupled device (CCD) image sensor or a complementary metal oxide semiconductor (CMOS) image sensor. Those skilled in the art should be able to design and implement the first image sensing apparatus 12a and the second image sensing apparatus 12b according to practical operation requirements and the instant embodiment is not limited thereto.

In practice, for enhancing the reflection effect of the first, the second, and the third reflecting units 140, 150, 310, an additional light-emitting component having similar structure as the light-emitting component 120 can be used and configured to illuminate the touch surface 110. The newly added light-emitting component 120 may be integrated with the second image sensing apparatus 12b at the second corner. The newly added light-emitting component 120 may be integrated with the second image sensing apparatus 12b by sticking, screwing or fastening, so as to fixedly position or mount the light-emitting component 120 on the second image sensing apparatus 12b.

Accordingly, the optical touch system 3 may further enhance the recognition rate of touch point by disposing two additional image sensing apparatuses. In another embodiment, the optical touch system 3 may also include three, four or more than four image sensing apparatus, and respectively disposes these image sensing apparatuses at different locations on the touch surface 110. These image sensing apparatuses can be configured to have overlapped sensing area to increase touch recognition rate of the optical touch system 3.

In other words, the number of the image sensing apparatus employed in the optical touch system 3 and the deployed positions can be configured and designed according to the exact structure of and the operation requirement, and the instant embodiment is not limited thereto.

The object analyzation depicted in FIG. can be implemented by programming the corresponding program codes into the processing unit 13 (which can be implemented by a processing chip or a micro-controller) via firmware design and executed by the processing unit 13 during the operation of the optical touch system 3. FIG. 15-1 and FIG. 15-2 are merely used to illustrate an implementation of the object analyzation method for the optical touch system 3 and the instant disclosure is not limited thereto.

Additionally, the present disclosure also discloses a non-transitory computer-readable media for storing the computer executable program codes of the object analyzation method depicted in FIG. 6, FIG. 15-1 and FIG. 15-2, the method depicted in FIG. 12 for defining the bright region as well as the object analyzation and determination method depicted in FIG. 7, FIG. 8, FIG. 10, and FIG. 11. The non-transitory computer-readable media may be a floppy disk, a hard disk, a compact disk (CD), a flash drive, a magnetic tape, accessible online storage database or any type of storage media having similar functionality known to those skilled in the art.

In summary, an optical touch system and an object analyzation method thereof are disclosed in the present disclosure, in which the object analyzation method operatively capture the image correspond to the pointer when the pointer approaches a touch sensing region of the optical touch system. The optical touch system can quickly and accurately determine whether an approaching object is touching the touch surface of the optical touch system or hovering over the touch surface by analyzing the brightness distribution of a shadowed region in the image captured across the touch surface, the optical touch system can thus accurately identify and determine the touch state of a pointer. The object analyzation method further is capable of deciding whether to compute the touch coordinate of the object detected, thereby effectively improves the recognition rate of touch points in the optical touch system and the operation efficiency of the optical touch system.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An object analyzation method of an optical touch system, comprising:
    capturing a first image across a touch surface of a panel with an image sensing apparatus, wherein the first image has an object image formed therein corresponding to the position of a pointer on the touch surface;
    defining an image window corresponding to the object image in the first image; and
    determining whether the pointer is touching the touch surface or hovering over the touch surface according to the brightness difference between a first pixel group and a second pixel group defined in the image window;
    wherein the first pixel group comprises at least a high brightness pixel while the second pixel group comprises at least a low brightness pixel, and the pixel value of the high brightness pixel is larger than a preset threshold while the pixel value of the low brightness pixel is smaller than the preset threshold.

2. The object analyzation method according to claim 1, further comprising:
    computing a touch coordinate of the pointer relative to the touch surface according to the image position of the object image formed in the first image when determines that the pointer is touching the touch surface.

3. The object analyzation method according to claim 1, wherein the step of determining whether the pointer is touching the touch surface or hovering over the touch surface further comprises:
    when the ratio computed between the average pixel value of the first pixel group and the average pixel value of the second pixel group is greater than a preset pixel ratio value, determines that the pointer is hovering over the touch surface; and
    when the ratio computed between the average pixel value of the first pixel group and the average pixel value of the second pixel group is less than or equal to the preset pixel ratio value, determines that the pointer is touching the touch surface.

4. The object analyzation method according to claim 1, wherein the step of determining whether the pointer is touching the touch surface or hovering over the touch surface comprises:
    computing a pixel ratio between the maximum pixel value and the minimum pixel value for each pixel column in the image window;
    comparing the pixel ratio of the pixel column in the image window having the largest pixel ratio with a preset pixel ratio value to determine whether the pointer is touching the touch surface or hovering over the touch surface;
    when the pixel ratio of the pixel column having the largest pixel ratio is computed to be greater than the preset pixel ratio value, determines that the pointer is hovering over the touch surface; and
    when the pixel ratio of the pixel column having the largest pixel ratio is computed to be less than or equal to the preset pixel ratio value, determines that the pointer is touching the touch surface.

5. The object analyzation method according to claim 1, wherein the step of determining whether the pointer is touching the touch surface or hovering over the touch surface comprises:
    computing a pixel value difference between the maximum pixel value and the minimum pixel value for each pixel column in the image window;
    comparing the pixel value difference of the pixel column in the image window having the smallest pixel value difference with a preset pixel value difference to determine whether the pointer is touching the touch surface or hovering over the touch surface;
    when the pixel value difference of the pixel column having the smallest pixel value difference is computed to be greater than the preset pixel value difference, determines that the pointer is hovering over the touch surface; and
    when the pixel value difference of the pixel column having the smallest pixel value difference is computed to be less than the preset pixel value difference, determines that the pointer is touching the touch surface.

6. The object analyzation method according to claim 1, wherein the step of defining the image window that corresponds to the object image comprises:

defining a left boundary and a right boundary that correspond to the object image in the first image to define the image window that corresponds to the object image in the first image.

7. The object analyzation method according to claim 6, wherein the step of defining the left and right boundaries comprises:
   capturing a background image across the touch surface of the panel with the image sensing apparatus, wherein the background image does not contain the object image of the pointer;
   comparing pixel values of each pixel column in the background image with a predetermined pixel value and defining an upper brightness bound and a lower brightness bound in each pixel column, wherein each pixel lying between the upper brightness bound and the lower brightness bound has a pixel value greater than the predetermined pixel value;
   defining a bright region in the background image according to the upper brightness bound and the lower brightness bound;
   computing the sum of brightness of all pixels in each pixel column inside the bright region of the background image to generate a background brightness curve data; and
   defining the left boundary and the right boundary that correspond to the object image in the first image according to the background brightness curve data of the background image.

8. The object analyzation method according to claim 7, wherein the step of defining the left and right boundaries further comprises:
   computing the sum of pixel values of each pixel column in the first image corresponding to the bright region of the background image;
   generating a brightness curve data that corresponds to the brightness distribution in the first image along the pixel column direction; and
   defining the left boundary and the right boundary that correspond to the object image in the first image according to the brightness difference between the brightness curve data and the background brightness curve data.

9. The object analyzation method according to claim 7, wherein the step of defining the predetermined pixel value comprises:
   computing an average brightness value of the background image; and
   setting the predetermined pixel value according to the average brightness value and a preset weighting factor.

10. An object analyzation method of an optical touch system, the optical touch system comprising a panel, a first image sensing apparatus, and a second image sensing apparatus, the first and second image sensing apparatuses being disposed at different locations on the touch panel and configured to have overlapping sensing area, the object analyzation method comprising:
   capturing a first background image and a second background image across a touch surface of the panel with the first image sensing apparatus and the second image sensing apparatus, respectively before a pointer approaches the touch surface;
   capturing a first image and a second image across the touch surface of the panel with the first image sensing apparatus and the second image sensing apparatus, respectively, wherein the first image has a first object image formed therein corresponding to the position of the pointer on the touch surface with respect to the first image sensing apparatus and the second image has a second object image formed therein corresponding to the position of the pointer on the touch surface with respect to the second image sensing apparatus;
   defining a first image window corresponding to the first object image in the first image;
   defining a second image window corresponding to the second object image in the second image; and
   determining whether the pointer is touching the touch surface or hovering over the touch surface according to the brightness difference between a first pixel group and a second pixel group defined in the first image window and the brightness difference between a third pixel ground and a fourth pixel group defined in the second image window;
   wherein each of the first pixel group and the third pixel group comprises at least a high brightness pixel while each of the second pixel group and the fourth pixel group comprises at least a low brightness pixel, and the pixel value of the high brightness pixel is larger than a preset threshold while the pixel value of the low brightness pixel is smaller than the preset threshold.

11. The object analyzation method according to claim 10, further comprising:
   when the brightness difference of the first image window and the brightness difference of the second image window simultaneously indicate that the pointer is touching the touch surface, determines that the pointer is touching the touch surface; and
   computing a touch coordinate of the pointer relative to the touch surface according to the image position of the first object image formed in the first image and the image position of the second object image formed in the second image.

12. The object analyzation method according to claim 11, further comprising:
   when either the brightness difference of the first image window or the brightness difference of the second image window indicates that the pointer is hovering over the touch surface, determines that the pointer is hovering over the touch surface and does not compute the touch coordinate of the pointer relative to the touch surface.

13. The object analyzation method according to claim 10, wherein the step of determining whether the pointer is touching the touch surface or hovering over the touch surface further comprises:
   when either the ratio between the average pixel value of the first pixel group or the average pixel value of the second pixel group or the ratio between the average pixel value of the third pixel group and the average pixel value of the fourth pixel group is greater than a preset pixel ratio value, determines that the pointer is hovering over the touch surface; and
   when both the ratio between the average pixel value of the first pixel group and the average pixel value of the second pixel group and the ratio between the average pixel value of the third pixel group and the average pixel value of the fourth pixel group are less than or equal to the preset pixel ratio value, determines that the pointer is touching the touch surface.

14. The object analyzation method according to claim 10, wherein the step of determining whether the pointer is touching the touch surface or hovering over the touch surface comprises:

computing a first pixel ratio between the maximum pixel value and the minimum pixel value for each pixel column in the first image window;

computing a second pixel ratio between the maximum pixel value and the minimum pixel value for each pixel column in the second image window;

comparing the first pixel ratio of the pixel column in the first image window having the largest first pixel ratio and the second pixel ratio of the pixel column in the second image window having the largest second pixel ratio with a preset pixel ratio value, respectively;

when both the first pixel ratio of the pixel column in the first image window having the largest first pixel ratio and the second pixel ratio of the pixel column in the second image window having the largest second pixel ratio are less than or equal to the preset pixel ratio value, determines that the pointer is touching the touch surface.

15. The object analyzation method according to claim 14, wherein the step of determining whether the pointer is touching the touch surface or hovering over the touch surface further comprises:

when either the first pixel ratio of the pixel column in the first image window having the largest first pixel ratio or the second pixel ratio of the pixel column in the second image window having the largest second pixel ratio is greater than the preset pixel ratio value, determines that the pointer is hovering over the touch surface.

16. The object analyzation method according to claim 10, wherein the step of determining whether the pointer is touching the touch surface or hovering over the touch surface comprises:

computing a first pixel value difference between the maximum pixel value and the minimum pixel value for each pixel column in the first image window;

computing a second pixel value difference between the maximum pixel value and the minimum pixel value for each pixel column in the second image window;

comparing the first pixel value difference of the pixel column in the first image window having the smallest pixel value difference and the second pixel value difference of the pixel column in the second image window having the smallest pixel value difference respectively with a preset pixel value difference; and when both the first pixel value difference of the pixel column in the first image window having the smallest first pixel value difference and the second pixel value difference of the pixel column in the second image window having the smallest second pixel value difference are less than the preset pixel value difference, determines that the pointer is touching the touch surface.

17. The object analyzation method according to claim 16, wherein the step of determining whether the pointer is touching the touch surface or hovering over the touch surface further comprises:

when either the first pixel value difference of the pixel column in the first image window having the smallest first pixel value difference or the second pixel value difference of the pixel column in the second image window having the smallest second pixel value difference is computed to be greater than the preset pixel value difference, determines that the pointer is hovering over the touch surface.

18. An optical touch system, comprising:
a display apparatus;
a panel having a touch surface;
at least one light-emitting component, configured to generate a light illuminating the touch surface;
a reflective mirror, configured to generate the mirror image of the panel;
at least one reflecting unit, configured to reflect the light generated by the light-emitting component;
an image sensing apparatus, configured to capture a plurality of images across the touch surface of the panel, and at least one of the images captured has an object image corresponding to a pointer and the mirror image of the object image formed therein; and
a processing unit coupled to the light-emitting component, the image sensing apparatus, and the display apparatus;
wherein the processing unit operatively drives the image sensing apparatus to capture a first image across the touch surface of the panel containing the object image corresponding to the position of a pointer on the touch surface, defines an image window corresponding to the object image in the first image thereafter, determines whether the pointer is touching the touch surface or hovering over the touch surface according to the brightness difference between a first pixel group and a second pixel group defined in the image window, and decides whether or not to compute a touch coordinate of the pointer relative to the touch surface based on the determination result;
wherein the first pixel group comprises at least a high brightness pixel while the second pixel group comprises at least a low brightness pixel and the pixel value of the high brightness pixel is larger than a preset threshold while the pixel value of the low brightness pixel is smaller than the preset threshold.

19. The optical touch system according to claim 18, wherein the processing unit computes the touch coordinate of the pointer relative to the touch surface according to the image position of the object image and the mirror image thereof in the first image when determines that the pointer is touching the touch surface and outputs the touch coordinate to the display apparatus to correspondingly control the operation of a cursor displayed on the display apparatus.

20. The optical touch system according to claim 18, wherein when the processing unit determines that the ratio computed between the average pixel value of the first pixel group and the average pixel value of the second pixel group is greater than a preset pixel ratio value, the processing unit determines that the pointer is hovering over the touch surface; when the processing unit determines that the ratio computed between the average pixel value of the first pixel group and the average pixel value of the second pixel group is less than or equal to the preset pixel ratio value, the processing unit determines that the pointer is touching the touch surface.

21. The optical touch system according to claim 18, wherein the processing unit computes the pixel ratio between the maximum pixel value and the minimum pixel value for each pixel column in the image window and compares the pixel ratio of the pixel column in the image window having the largest pixel ratio with a preset pixel ratio value to determine whether the pointer is touching the touch surface or hovering over the touch surface; when the processing unit determines that the pixel ratio of the pixel column having the largest pixel ratio is computed to be greater than the preset pixel ratio value, the processing unit determines that the pointer is hovering over the touch surface; when the processing unit determines that the pixel ratio of the pixel column having the largest pixel ratio is computed to be less than or equal to the preset pixel ratio value, the processing unit determines that the pointer is touching the touch surface.

22. The optical touch system according to claim 18, wherein the processing unit computes a pixel value difference between the maximum pixel value and the minimum pixel value for each pixel column in the image window and compares the pixel value difference of the pixel column in the image window having the smallest pixel value difference with a preset pixel value difference to determine whether the pointer is touching the touch surface or hovering over the touch surface; when the processing unit determines that the pixel value difference of the pixel column having the smallest pixel value difference is computed to be greater than the preset pixel value difference, the processing unit determines that the pointer is hovering over the touch surface; when the processing unit determines that the pixel value difference of the pixel column having the smallest pixel value difference is computed to be less than the preset pixel value difference, the processing unit determines that the pointer is touching the touch surface.

23. The optical touch system according to claim 18, wherein the processing unit defines the image window in the first image by defining a left boundary and a right boundary that correspond to the object image in the first image based on the image position of the object image formed in the first image.

24. An object analyzation method of an optical touch system, comprising:
  capturing a first image across a touch surface of a panel with an image sensing apparatus, wherein the first image has an object image formed therein corresponding to the position of a pointer on the touch surface;
  defining an image window corresponding to the object image in the first image;
  computing an average pixel value for each pixel column in the image window;
  comparing the average pixel value of each pixel column in the image window with a preset average pixel value to determine whether the pointer is touching the touch surface or hovering over the touch surface;
  when the average pixel value of the pixel column having the smallest average pixel value is computed to be greater than the preset average pixel value, determines that the pointer is hovering over the touch surface; and
  when the average pixel value of the pixel column having the smallest average pixel value is computed to be less than the preset average pixel value, determines that the pointer is touching the touch surface.

25. An object analyzation method of an optical touch system, the optical touch system comprising a panel, a first image sensing apparatus, and a second image sensing apparatus, the first and second image sensing apparatuses being disposed at different locations on the touch panel and configured to have overlapping sensing area, the object analyzation method comprising:
  capturing a first background image and a second background image across a touch surface of the panel with the first image sensing apparatus and the second image sensing apparatus, respectively before a pointer approaches the touch surface;
  capturing a first image and a second image across the touch surface of the panel with the first image sensing apparatus and the second image sensing apparatus, respectively, wherein the first image has a first object image formed therein corresponding to the position of the pointer on the touch surface with respect to the first image sensing apparatus and the second image has a second object image formed therein corresponding to the position of the pointer on the touch surface with respect to the second image sensing apparatus;
  defining a first image window corresponding to the first object image in the first image;
  defining a second image window corresponding to the second object image in the second image;
  computing a first average pixel value for each pixel column in the first image window;
  computing a second average pixel value for each pixel column in the second image window;
  comparing the first average pixel value of each pixel column in the first image window having the smallest first average pixel value and the second average pixel value of each pixel column in the second image window having the smallest second average pixel value respectively with a preset average pixel value; and
  when both the first average pixel value of the pixel column in the first image window having the smallest first average pixel value and the second average pixel value of the pixel column in the second image window having the smallest second average pixel value are computed to be less than the preset average pixel value, determines that the pointer is touching the touch surface.

26. The object analyzation method according to claim 25, wherein the step of determining whether the pointer is touching the touch surface or hovering over the touch surface further comprises:
  when either the first average pixel value of the pixel column in the first image window having the smallest first average pixel value or the second average pixel value of the pixel column in the second image window having the smallest second average pixel value is computed to be greater than the preset average pixel value, determines that the pointer is hovering over the touch surface.

27. An optical touch system, comprising:
  a display apparatus;
  a panel having a touch surface;
  at least one light-emitting component, configured to generate a light illuminating the touch surface;
  a reflective mirror, configured to generate the mirror image of the panel;
  at least one reflecting unit, configured to reflect the light generated by the light-emitting component;
  an image sensing apparatus, configured to capture a plurality of images across the touch surface of the panel, and at least one of the images captured has an object image corresponding to a pointer and the mirror image of the object image formed therein; and
  a processing unit coupled to the light-emitting component, the image sensing apparatus, and the display apparatus;
  wherein the processing unit computes an average pixel value for each pixel column in the image window and compares the average pixel value of each pixel column in the image window with a preset average pixel value to determine whether the pointer is touching the touch surface or hovering over the touch surface; when the processing unit determines that the average pixel value of the pixel column having the smallest average pixel value is computed to be greater than the preset average pixel value, the processing unit determines that the pointer is hovering over the touch surface; when the processing unit determines that the average pixel value of the pixel column having the smallest average pixel value is computed to be less than the preset average pixel value, the processing unit determines that the pointer is touching the touch surface, and decides whether or not to compute a touch coordinate of the pointer relative to the touch surface based on the determination result.

* * * * *